US012574748B2

(12) United States Patent
Luan et al.

(10) Patent No.: US 12,574,748 B2
(45) Date of Patent: Mar. 10, 2026

(54) METHODS AND APPARATUSES FOR MARITIME COMMUNICATION

(71) Applicant: Telefonaktiebolaget LM Ericsson (publ), Stockholm (SE)

(72) Inventors: Shunqi Luan, Shanghai (CN); Tianyi Li, Shanghai (CN); Binhong Huang, Guangzhou (CN)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 524 days.

(21) Appl. No.: 18/027,721

(22) PCT Filed: Sep. 28, 2020

(86) PCT No.: PCT/CN2020/118469
§ 371 (c)(1),
(2) Date: Mar. 22, 2023

(87) PCT Pub. No.: WO2022/061907
PCT Pub. Date: Mar. 31, 2022

(65) Prior Publication Data
US 2025/0008338 A1     Jan. 2, 2025

(51) Int. Cl.
*H04W 16/14* (2009.01)
*H04W 72/0453* (2023.01)
*H04W 72/56* (2023.01)

(52) U.S. Cl.
CPC ....... *H04W 16/14* (2013.01); *H04W 72/0453* (2013.01); *H04W 72/56* (2023.01)

(58) Field of Classification Search
None
See application file for complete search history.

(56) References Cited

U.S. PATENT DOCUMENTS

2008/0233938 A1*  9/2008  Bradley .............. H04W 84/005
                                                      455/418
2015/0126212 A1*  5/2015  Karabinis ................ H04B 5/45
                                                      455/454
(Continued)

FOREIGN PATENT DOCUMENTS

CN         105323859 A      2/2016
CN         108988992 A      12/2018
(Continued)

OTHER PUBLICATIONS

"3rd Generation Partnership Project; Technical Specification Group Core Network and Terminals; 5G System; Common Data Types for Service Based Interfaces; Stage 3 (Release 16)", 3GPP TS 29.571 V16.4.0, Jun. 2020, 121 pages.
(Continued)

*Primary Examiner* — Srinivasa R Reddivalam

(74) *Attorney, Agent, or Firm* — Murphy, Bilak & Homiller, PLLC

(57) ABSTRACT

Methods and apparatuses are disclosed for maritime communication. According to an embodiment, a network comprises a plurality of first base stations and first servers at a plurality of respective first maritime vessels. In response to a trigger event indicating that a spectrum allocation is needed for two or more of the plurality of first maritime vessels, a management server in the network determines importance values of the two or more first maritime vessels
(Continued)

In response to a trigger event indicating that a spectrum allocation is needed for two or more of the plurality of first maritime vessels, determine importance values of the two or more first maritime vessels in the spectrum allocation, based on information related to the network ∿ 602

Allocate an available spectrum to the two or more first maritime vessels based at least on the importance values ∿ 604 in the spectrum allocation, based on information related to the network. The management server allocates an available spectrum to the two or more first maritime vessels based at least on the importance values.

18 Claims, 10 Drawing Sheets

(56) References Cited

U.S. PATENT DOCUMENTS

| | | | |
|---|---|---|---|
| 2016/0252350 A1 | 9/2016 | Wharton et al. | |
| 2016/0316422 A1* | 10/2016 | Regan | ................... H04W 24/02 |

FOREIGN PATENT DOCUMENTS

| | | |
|---|---|---|
| CN | 109863775 A | 6/2019 |
| WO | 2005067324 A1 | 7/2005 |
| WO | 2014191375 A2 | 12/2014 |
| WO | 2018114000 A1 | 6/2018 |
| WO | 2018211488 A1 | 11/2018 |
| WO | 2021217357 A1 | 11/2021 |

OTHER PUBLICATIONS

"3rd Generation Partnership Project; Technical Specification Group Core Network and Terminals; 5G System; Principles and Guidelines for Services Definition; Stage 3 (Release 16) The", 3GPP TS 29.501 V16.5.0, Sep. 2020, 77 pages.

"3rd Generation Partnership Project; Technical Specification Group Radio Access Network; NR; User Equipment (UE) radio transmission and reception; Part 1: Range 1 Standalone (Release 16)", 3GPP TS 38.101-1 V16.3.0, Mar. 2020, 332 pages.

"3rd Generation Partnership Project; Technical Specification Group Radio Access Network; NR; User Equipment (UE) radio transmission and reception; Part 2: Range 2 Standalone (Release 16)", 3GPP TS 38.101-2 V16.3.1, Mar. 2020. 170 pages.

Mao, Xuehong , et al., "Adaptive Soft Frequency Reuse for Inter-Cell Interference Coordination in SC-FDMA Based 3GPP LTE Uplinks", IEEE Globecom 2008, Nov. 30-Dec. 4, 2008, 8 pages.

Wamser, Florian , et al., "Soft Frequency Reuse in the Uplink of an OFDMA Network", 2010 IEEE 71st Vehicular Technology Conference, May 16-19, 2010, 5 pages.

* cited by examiner

In response to a trigger event indicating that a second maritime vessel can be switched from the second mode to the first mode, update an operation mode of the second maritime vessel from the second mode to the first mode ⌇302

Notify the update of the operation mode of the second maritime vessel to at least one target maritime vessel in the network ⌇304

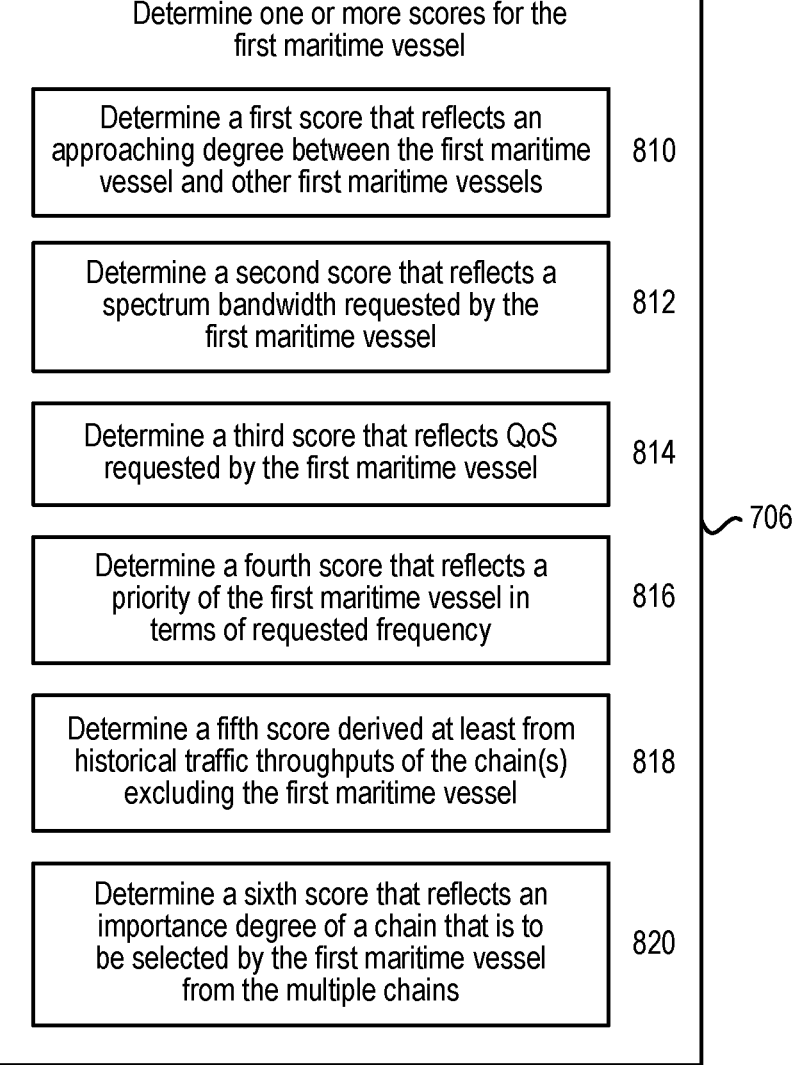

Determine one or more scores for the first maritime vessel

Determine a first score that reflects an approaching degree between the first maritime vessel and other first maritime vessels   810

Determine a second score that reflects a spectrum bandwidth requested by the first maritime vessel   812

Determine a third score that reflects QoS requested by the first maritime vessel   814

706

Determine a fourth score that reflects a priority of the first maritime vessel in terms of requested frequency   816

Determine a fifth score derived at least from historical traffic throughputs of the chain(s) excluding the first maritime vessel   818

Determine a sixth score that reflects an importance degree of a chain that is to be selected by the first maritime vessel from the multiple chains   820

FIG. 8

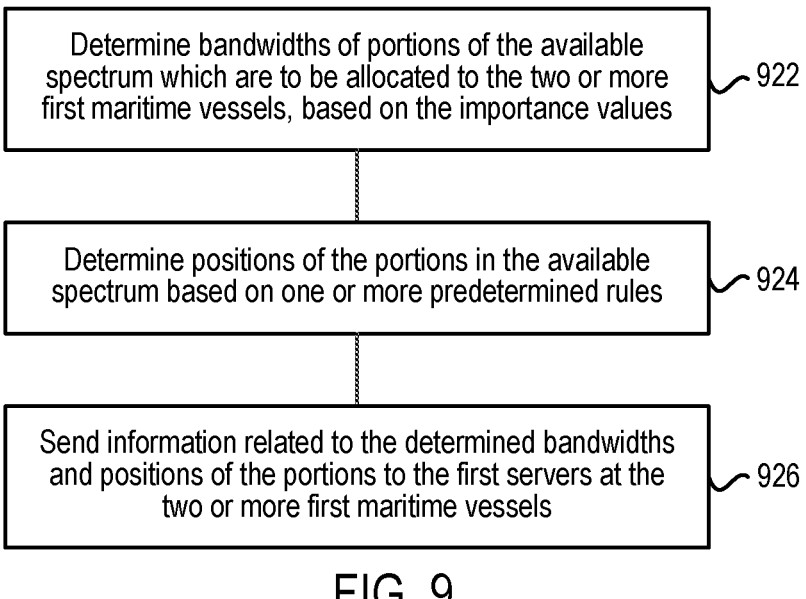

Determine bandwidths of portions of the available spectrum which are to be allocated to the two or more first maritime vessels, based on the importance values ⟋ 922

Determine positions of the portions in the available spectrum based on one or more predetermined rules ⟋ 924

Send information related to the determined bandwidths and positions of the portions to the first servers at the two or more first maritime vessels ⟋ 926

FIG. 9

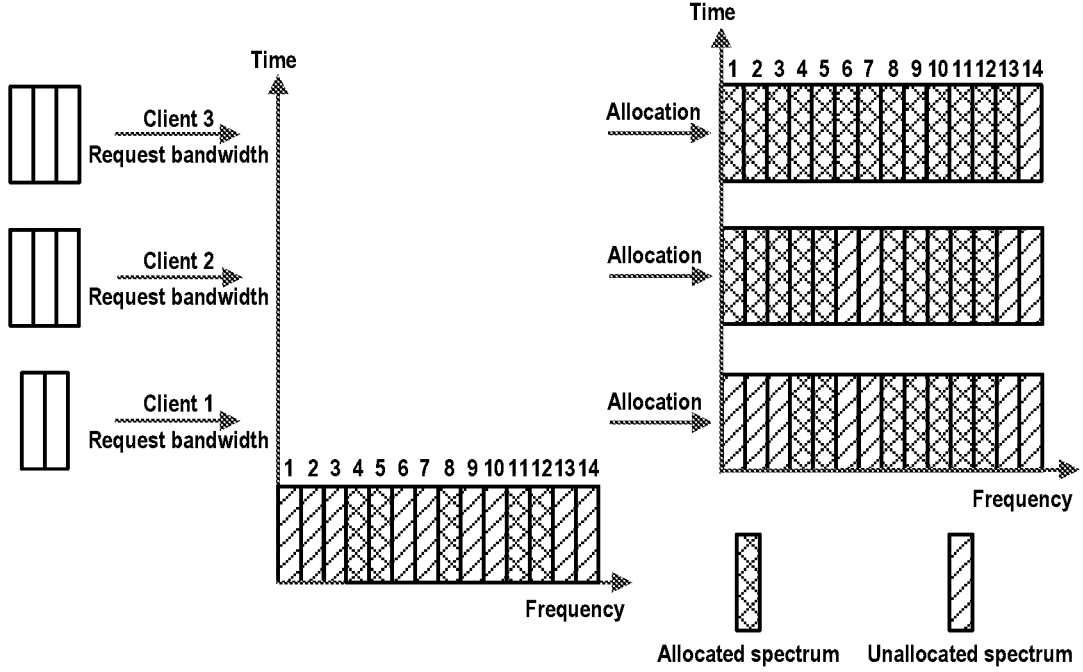

Spectrum table (bandwidths in ClusterDB)

FIG. 10

METHODS AND APPARATUSES FOR MARITIME COMMUNICATION

RELATED APPLICATIONS

This application is a U.S. National Phase Application of PCT/CN2020/118469 filed 28 Sep. 2020. The entire contents of the aforementioned application is incorporated herein by reference.

TECHNICAL FIELD

Embodiments of the disclosure generally relate to communication, and, more particularly, to methods and apparatuses for maritime communication.

BACKGROUND

This section introduces aspects that may facilitate better understanding of the present disclosure. Accordingly, the statements of this section are to be read in this light and are not to be understood as admissions about what is in the prior art or what is not in the prior art.

Typically, a maritime vessel communicates with remote communication devices via terrestrial networks, or satellite networks when the maritime vessel is out of reach of the terrestrial networks or in other special conditions. For instance, when out of range of the terrestrial networks, machine-to-machine (M2M) devices on a maritime vessel may connect to a base station on the maritime vessel, which in turn is connected via a satellite network to a core network somewhere on land. The connection decision is based on the vessel's proximity to the terrestrial networks.

In the above typical solution, the maritime vessels, however, do not take advantage of other maritime vessels in close proximity to create opportunities for more cost effective and efficient communication therebetween and, ultimately, to the terrestrial networks. Also, it is not uncommon for a maritime vessel to lose satellite connectivity because the heading of the maritime vessel is such that a line of sight to the satellite from the satellite communication equipment onboard the maritime vessel becomes blocked by structures onboard the maritime vessel. Besides, limited by the technique, the satellite network cannot provide high speed service, like file transfer or video. Additionally, the typical solution does not take into account national jurisdictions with respect to the location of the maritime vessels, and associated potential ad hoc networks, to send and receive information both legally and efficiently.

Despite continued efforts to improve communication and reduce communication costs for a maritime vessel, a system is needed to mitigate the substantial hindrances for reliable radio communication from the maritime vessel to external networks such as the terrestrial networks.

SUMMARY

This summary is provided to introduce a selection of concepts in a simplified form that are further described below in the detailed description. This summary is not intended to identify key features or essential features of the claimed subject matter, nor is it intended to be used to limit the scope of the claimed subject matter.

One of the objects of the disclosure is to provide an improved solution for maritime communication. In particular, one of the problems to be solved by the disclosure is that some unused spectrums are not considered for allocation in the existing solution.

According to a first aspect of the disclosure, there is provided a method performed by a management server in a network. The network may comprise a plurality of first base stations and first servers at a plurality of respective first maritime vessels. The method may comprise, in response to a trigger event indicating that a spectrum allocation is needed for two or more of the plurality of first maritime vessels, determining importance values of the two or more first maritime vessels in the spectrum allocation, based on information related to the network. The method may further comprise allocating an available spectrum to the two or more first maritime vessels based at least on the importance values.

In this way, it is possible to automatically and effectively implement spectrum allocation for maritime communication.

In an embodiment of the disclosure, the plurality of first maritime vessels may be in a first mode where a licensed spectrum and an unlicensed spectrum can be used freely without restriction of national jurisdiction.

In an embodiment of the disclosure, the available spectrum may comprise: the unlicensed spectrum; and a remaining part of the licensed spectrum excluding a part that has been used by the plurality of first maritime vessels.

In an embodiment of the disclosure, the plurality of first maritime vessels may be connected to a terrestrial network via one or more second maritime vessels which are in a second mode where the use of the licensed spectrum and the unlicensed spectrum is subject to national jurisdiction.

In an embodiment of the disclosure, the management server may be a cluster comprising computing nodes distributed on at least two of the plurality of first maritime vessels.

In an embodiment of the disclosure, the management server may be one of the plurality of first servers.

In an embodiment of the disclosure, the information related to the network may comprise one or more of: positioning information of the plurality of first maritime vessels; spectrum request information of the two or more first maritime vessels; service request information of the two or more first maritime vessels; available spectrum information indicating the available spectrum for the two or more first maritime vessels; and chain information related to chains extending from the two or more first maritime vessels to a second maritime vessel that is connected directly to the terrestrial network.

In an embodiment of the disclosure, determining an importance value of a first maritime vessel in the spectrum allocation may comprise determining one or more scores for the first maritime vessel based on one or more of the positioning information, the spectrum request information, the service request information, the available spectrum information and the chain information. Determining an importance value of a first maritime vessel in the spectrum allocation may further comprise determining the importance value of the first maritime vessel based on the one or more scores.

In an embodiment of the disclosure, the positioning information may comprise geographical locations and moving status of the plurality of first maritime vessels. Determining one or more scores for the first maritime vessel may comprise determining, based on the positioning information, a first score that reflects an approaching degree between the first maritime vessel and other first maritime vessels.

In an embodiment of the disclosure, the higher the approaching degree may be, the larger the importance value of the first maritime vessel may be.

In an embodiment of the disclosure, the spectrum request information may comprise spectrum bandwidths requested by the two or more first maritime vessels. Determining one or more scores for the first maritime vessel may comprise determining, based on the spectrum request information, a second score that reflects a spectrum bandwidth requested by the first maritime vessel.

In an embodiment of the disclosure, the larger the requested bandwidth may be, the larger the importance value of the first maritime vessel may be.

In an embodiment of the disclosure, the service request information may comprise quality of service (QoS) requested by the two or more first maritime vessels. Determining one or more scores for the first maritime vessel may comprise determining, based on the service request information, a third score that reflects QoS requested by the first maritime vessel.

In an embodiment of the disclosure, the higher the requested QoS may be, the larger the importance value of the first maritime vessel may be.

In an embodiment of the disclosure, determining one or more scores for the first maritime vessel may comprise determining, based on the positioning information and the spectrum request information, a fourth score that reflects a priority of the first maritime vessel in terms of requested frequency.

In an embodiment of the disclosure, the higher the priority of the first maritime vessel may be, the larger the importance value of the first maritime vessel may be.

In an embodiment of the disclosure, the chain information for the first maritime vessel may comprise: topology of chain(s) extending from the first maritime vessel to the second maritime vessel that is connected directly to the terrestrial network; and historical traffic throughput information related to the chain(s). Determining one or more scores for the first maritime vessel may comprise determining, based on the chain information, a fifth score derived at least from historical traffic throughput(s) of the chain(s) excluding the first maritime vessel.

In an embodiment of the disclosure, the fifth score may be one of: a sum of the historical traffic throughput(s) of the chain(s) excluding the first maritime vessel; a sum of historical spectrum efficiency(ies) of the chain(s) excluding the first maritime vessel; a sum of estimated throughput of the first maritime vessel which are based on the historical spectrum efficiency(ies) of the chain(s) excluding the first maritime vessel; and a sum of ratios between the estimated throughput of the first maritime vessel and the historical traffic throughput(s) of the chain(s) excluding the first maritime vessel.

In an embodiment of the disclosure, the larger the sum may be, the larger the importance value of the first maritime vessel may be.

In an embodiment of the disclosure, the chain information for the first maritime vessel may comprise: topology of multiple chains extending from the first maritime vessel to the second maritime vessel that is connected directly to the terrestrial network; and historical traffic throughput information related to the multiple chains. Determining one or more scores for the first maritime vessel may comprise determining, based on the chain information, a sixth score that reflects an importance degree of a chain that is to be selected by the first maritime vessel from the multiple chains.

In an embodiment of the disclosure, an importance degree of a chain from the multiple chains may be determined such that the larger one of following is, the less frequently the chain is selected: a historical traffic throughput of the chain excluding the first maritime vessel; a historical spectrum efficiency of the chain excluding the first maritime vessel; an estimated throughput of the first maritime vessel which is based on the historical spectrum efficiency of the chain excluding the first maritime vessel; and a ratio between the estimated throughput of the first maritime vessel and the historical traffic throughput of the chain excluding the first maritime vessel.

In an embodiment of the disclosure, the larger the sixth score may be, the larger the importance value of the first maritime vessel may be.

In an embodiment of the disclosure, the trigger event may be one of: the management server receives spectrum requests from the first servers at the two or more first maritime vessels; at least one of the importance values of the two or more first maritime vessels is changed by a predetermined threshold or more after a spectrum allocation is finished; and a number of the plurality of first maritime vessels is increased or decreased after a spectrum allocation is finished.

In an embodiment of the disclosure, allocating the available spectrum to the two or more first maritime vessels may comprise determining bandwidths of portions of the available spectrum which are to be allocated to the two or more first maritime vessels, based on the importance values. Allocating the available spectrum to the two or more first maritime vessels may further comprise determining positions of the portions in the available spectrum based on one or more predetermined rules. Allocating the available spectrum to the two or more first maritime vessels may further comprise sending information related to the determined bandwidths and positions of the portions to the first servers at the two or more first maritime vessels.

In an embodiment of the disclosure, the bandwidth of the portion to be allocated to a first maritime vessel may be determined as: a bandwidth of the available spectrum multiplied by a ratio between the importance value of the first maritime vessel and a sum of the importance values of the two or more first maritime vessels.

In an embodiment of the disclosure, the one or more predetermined rules may comprise at least one of: lower frequency bands are preferentially selected for spectrum allocation; larger bandwidths are preferentially considered in spectrum allocation; continuous frequency bands are preferentially selected for spectrum allocation; in a case where no continuous frequency band is left, frequency band(s) having been allocated are reused to form a continuous frequency band; fragmental frequency bands are utilized as much as possible; and spectrum collision is avoided for less interference in frequency.

According to a second aspect of the disclosure, there is provided a method performed by a management server in a network. The network may comprise one or more first maritime vessels in a first mode where a licensed spectrum and an unlicensed spectrum can be used freely without restriction of national jurisdiction, and one or more second maritime vessels in a second mode where the use of the licensed spectrum and the unlicensed spectrum is subject to national jurisdiction. The method may comprise in response to a trigger event indicating that a second maritime vessel can be switched from the second mode to the first mode, updating an operation mode of the second maritime vessel from the second mode to the first mode. The method may further comprise notifying the update of the operation mode of the second maritime vessel to at least one target maritime vessel in the network.

In this way, it is possible to automatically and effectively switch a second maritime vessel from the second mode to the first mode.

In an embodiment of the disclosure, the trigger event may be one of: a first measurement report being received from a terminal device at the second maritime vessel which indicates a first status that a received signal quality from one of one or more first base stations at the one or more first maritime vessels is larger than a received signal quality from the terrestrial network or a second base station at another second maritime vessel by a predetermined value or more; a second measurement report being received from a terminal device at the second maritime vessel which indicates a second status that the first status has lasted for a predetermined period of time; and the first or second measurement report being received from the terminal device at the second maritime vessel and positioning information of the second maritime vessel indicating that the second maritime vessel is located at a first geographical area where the first mode is applicable.

In an embodiment of the disclosure, the management server may be a second server at the second maritime vessel.

In an embodiment of the disclosure, the management server may be a cluster comprising computing nodes distributed on at least two of the maritime vessels in the network.

According to a third aspect of the disclosure, there is provided a method performed by a management server in a network. The network may comprise two or more first maritime vessels in a first mode where a licensed spectrum and an unlicensed spectrum can be used freely without restriction of national jurisdiction, and one or more second maritime vessels in a second mode where the use of the licensed spectrum and the unlicensed spectrum is subject to national jurisdiction. The method may comprise in response to a trigger event indicating that a first maritime vessel can be switched from the first mode to the second mode, updating an operation mode of the first maritime vessel from the first mode to the second mode. The method may further comprise notifying the update of the operation mode of the first maritime vessel to at least one target maritime vessel in the network.

In this way, it is possible to automatically and effectively switch a first maritime vessel from the first mode to the second mode.

In an embodiment of the disclosure, the trigger event may be one of: a first measurement report being received from a terminal device at the first maritime vessel which indicates a first status that a received signal quality from one of one or more second base stations at the one or more second maritime vessels is larger than a received signal quality from a first base station at another first maritime vessel by a predetermined value or more; a second measurement report being received from a terminal device at the first maritime vessel which indicates a second status that the first status has lasted for a predetermined period of time; the first or second measurement report being received from the terminal device at the first maritime vessel and positioning information of the first maritime vessel indicating that the first maritime vessel is located at a second geographical area where the second mode is applicable.

In an embodiment of the disclosure, the management server may be a first server at the first maritime vessel.

In an embodiment of the disclosure, the management server may be a cluster comprising computing nodes distributed on at least two of the maritime vessels in the network.

According to a fourth aspect of the disclosure, there is provided a management server in a network. The network may comprise a plurality of first base stations and first servers at a plurality of respective first maritime vessels. The management server may comprise at least one processor and at least one memory. The at least one memory may contain instructions executable by the at least one processor, whereby the management server may be operative to, in response to a trigger event indicating that a spectrum allocation is needed for two or more of the plurality of first maritime vessels, determine importance values of the two or more first maritime vessels in the spectrum allocation, based on information related to the network. The management server may be further operative to allocate an available spectrum to the two or more first maritime vessels based at least on the importance values.

In an embodiment of the disclosure, the management server may be operative to perform the method according to the above first aspect.

According to a fifth aspect of the disclosure, there is provided a management server in a network. The network may comprise one or more first maritime vessels in a first mode where a licensed spectrum and an unlicensed spectrum can be used freely without restriction of national jurisdiction, and one or more second maritime vessels in a second mode where the use of the licensed spectrum and the unlicensed spectrum is subject to national jurisdiction. The management server may comprise at least one processor and at least one memory. The at least one memory may contain instructions executable by the at least one processor, whereby the management server may be operative to, in response to a trigger event indicating that a second maritime vessel can be switched from the second mode to the first mode, update an operation mode of the second maritime vessel from the second mode to the first mode. The management server may be further operative to notify the update of the operation mode of the second maritime vessel to at least one target maritime vessel in the network.

In an embodiment of the disclosure, the management server may be operative to perform the method according to the above second aspect.

According to a sixth aspect of the disclosure, there is provided a management server in a network. The network may comprise two or more first maritime vessels in a first mode where a licensed spectrum and an unlicensed spectrum can be used freely without restriction of national jurisdiction, and one or more second maritime vessels in a second mode where the use of the licensed spectrum and the unlicensed spectrum is subject to national jurisdiction. The management server may comprise at least one processor and at least one memory. The at least one memory may contain instructions executable by the at least one processor, whereby the management server may be operative to, in response to a trigger event indicating that a first maritime vessel can be switched from the first mode to the second mode, update an operation mode of the first maritime vessel from the first mode to the second mode. The management server may be further operative to notify the update of the operation mode of the first maritime vessel to at least one target maritime vessel in the network.

In an embodiment of the disclosure, the management server may be operative to perform the method according to the above third aspect.

According to a seventh aspect of the disclosure, there is provided a computer program product. The computer program product may comprise instructions which when executed by at least one processor, cause the at least one processor to perform the method according to any of the above first to third aspects.

According to an eighth aspect of the disclosure, there is provided a computer readable storage medium. The computer readable storage medium may comprise instructions which when executed by at least one processor, cause the at least one processor to perform the method according to any of the above first to third aspects.

According to a ninth aspect of the disclosure, there is provided a management server in a network. The network may comprise a plurality of first base stations and first servers at a plurality of respective first maritime vessels. The management server may comprise a determination module for, in response to a trigger event indicating that a spectrum allocation is needed for two or more of the plurality of first maritime vessels, determining importance values of the two or more first maritime vessels in the spectrum allocation, based on information related to the network. The management server may further comprise an allocation module for allocating an available spectrum to the two or more first maritime vessels based at least on the importance values.

According to a tenth aspect of the disclosure, there is provided a management server in a network. The network may comprise one or more first maritime vessels in a first mode where a licensed spectrum and an unlicensed spectrum can be used freely without restriction of national jurisdiction, and one or more second maritime vessels in a second mode where the use of the licensed spectrum and the unlicensed spectrum is subject to national jurisdiction. The management server may comprise an updating module for, in response to a trigger event indicating that a second maritime vessel can be switched from the second mode to the first mode, updating an operation mode of the second maritime vessel from the second mode to the first mode. The management server may further comprise a notification module for notifying the update of the operation mode of the second maritime vessel to at least one target maritime vessel in the network.

According to an eleventh aspect of the disclosure, there is provided a management server in a network. The network may comprise two or more first maritime vessels in a first mode where a licensed spectrum and an unlicensed spectrum can be used freely without restriction of national jurisdiction, and one or more second maritime vessels in a second mode where the use of the licensed spectrum and the unlicensed spectrum is subject to national jurisdiction. The management server may comprise an updating module for, in response to a trigger event indicating that a first maritime vessel can be switched from the first mode to the second mode, updating an operation mode of the first maritime vessel from the first mode to the second mode. The management server may further comprise a notification module for notifying the update of the operation mode of the first maritime vessel to at least one target maritime vessel in the network.

BRIEF DESCRIPTION OF THE DRAWINGS

These and other objects, features and advantages of the disclosure will become apparent from the following detailed description of illustrative embodiments thereof, which are to be read in connection with the accompanying drawings.

FIG. 8 is a flowchart for explaining the method of FIG. 7;

FIG. 9 is a flowchart for explaining the method of FIG. 6;

FIG. 10 is a diagram illustrating an exemplary example of spectrum allocation according to an embodiment of the disclosure;

DETAILED DESCRIPTION

For the purpose of explanation, details are set forth in the following description in order to provide a thorough understanding of the embodiments disclosed. It is apparent, however, to those skilled in the art that the embodiments may be implemented without these specific details or with an equivalent arrangement.

In the current commercial 3rd generation partnership project (3GPP) networks, the whole multi-frequency is planned according to cell coverage, capacity and user experience based on terrestrial site with static inter-cell distances and radio conditions. However, in a maritime system, distances between ships' base stations (BSs) vary with the sailing routes. So, the maritime system should maintain a relatively unstable and more complicated communication mechanism than a terrestrial one. It includes stability, reachability, recoverability and self-organization.

The present disclosure proposes an improved solution for maritime communication. The basic idea is to divide the marine area into at least two parts. In one of the two parts (e.g. in national waters area), the use of a licensed spectrum and an unlicensed spectrum is subject to national jurisdiction. This operation mode may be called offshore mode. In the offshore mode (or offshore area), maritime vessels work in an intra-frequency network mode with high priority of connectivity robustness and stability by a special scoring mechanism. More details of this operation mode can be obtained from PCT/CN2020/087293 which is another patent application filed by the Applicant and is incorporated herein by reference in its entirety. In the other of the two parts (e.g. in international waters area), the licensed spectrum and the unlicensed spectrum can be used freely without restriction of national jurisdiction. This operation mode may be called ocean mode. In the ocean mode (or ocean area), maritime vessels may work in a multi-frequency/multi-radio access technology (RAT)/dual connectivity radio access network (RAN) mode which may be based on terminal capabilities and network configurations. For example, maritime vessels may switch to the unlicensed spectrum based on the anchor frequency from the offshore mode. In addition, a maritime vessel can switch from one operation mode to the other operation mode based on positioning information and/or wireless measurement information.

The use of the above two operation modes may be based on the following considerations. During ships sail in the area of ocean-mode, planned bandwidth or downlink/uplink (DL/UL) frequency are no longer suitable for the continuous changing cell relationships and capacity requirements from users. In contrast, while ships sail in the area of offshore mode, robustness of connectivity and interference coordination become the main task of the maritime system. Thus, the system is capacity prioritized in the ocean mode and connectivity prioritized in the offshore mode.

Figure 1:
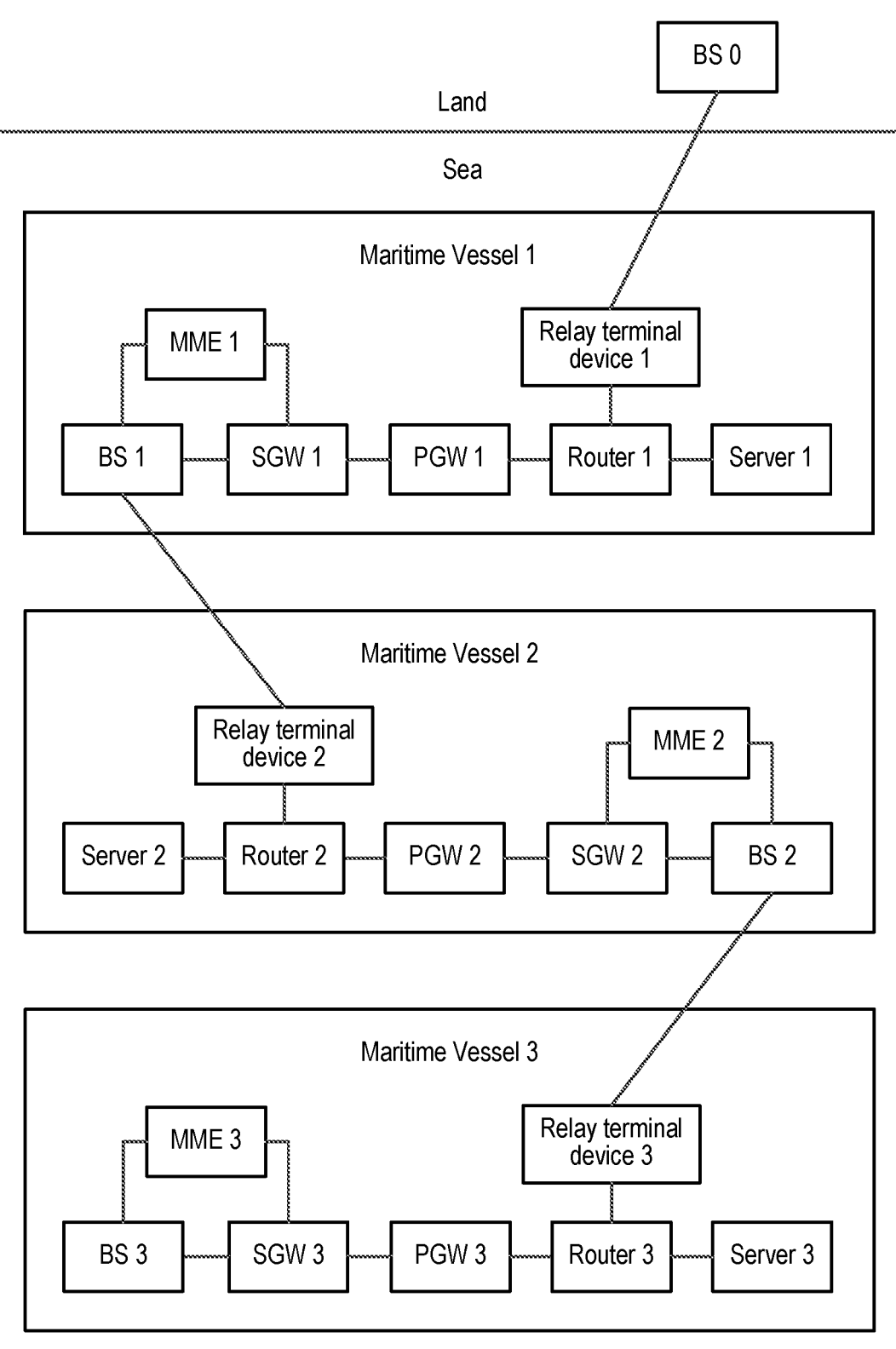
FIG. 1 is a diagram illustrating an exemplary communication system into which an embodiment of the disclosure is applicable.

Hereinafter, the solution will be described in detail with reference to FIGS. 1-17. FIG. 1 is a diagram showing an exemplary communication system into which an embodiment of the disclosure is applicable. As shown, the communication system comprises a base station on land and three maritime vessels (Maritime vessel 1, Maritime vessel 2 and Maritime vessel 3). Each maritime vessel comprises a base station, a mobility management entity (MME), a serving gateway (SGW), a packet data network (PDN) gateway (PGW), a router, a relay terminal device and a server (e.g. an application server or a mesh server). The base station can provide radio access communication links to terminal devices that are within its communication service cell. Examples of the base station may include, but not limited to, an evolved node B (eNB), a next generation node B (gNB), etc. For example, in a case where an eNB is deployed at a maritime vessel, compared with using other technologies such as WiFi to provide access for another maritime vessel, a super maritime wireless network with extended coverage (>100 km) can be provided without enhancement of terrestrial base stations. Only the base station on land is shown for brevity to represent the terrestrial network. The MME, the SGW and the PGW are merely exemplary components of the core network for illustration purpose. Some components of the core network such as a home subscriber server (HSS) are omitted for brevity. Some additional network elements such as an enterprise network management (ENM), an automatic identification system (AIS) system and an operation support system (OSS) may also be contained in the communication system. Although the core network is shown as part of an evolved packet core (EPC), any other suitable core network such as 5th generation core (5GC) may be used as the core network. Thus, the specific terms used herein do not limit the present disclosure only to the communication system related to the specific terms, which however can be more generally applied to other communication systems. The term mesh server may refer to a server which employs at least some aspect (e.g. peer discovering) of mesh technology. Although three maritime vessels are shown, the number of the maritime vessels may be two or more than three. The terms "maritime vessel" and "ship" may be interchangeably used herein. The number of each entity mentioned above in the maritime vessel may be more than one.

The relay terminal device 1 at Maritime vessel 1 can access the base station 0 on land and also act as an access point for other terminal device(s) at Maritime vessel 1. For example, any one of the relay terminal devices shown in FIG. 1 may be a customer premise equipment (CPE) capable of converting signals of one radio access technology (RAT) to signals of another RAT, such as converting LTE signals to WiFi signals. It is also possible that other terminal device(s) at Maritime vessel 1 may directly access the base station 0 on land. The relay terminal device 1 can be configured not to access the base station 1. The relay terminal device 1 can also relay traffic (e.g. data and/or signaling) between the core network 1 or the server 1 at Maritime vessel 1 and the terrestrial network. The router 1 at Maritime vessel 1 can route traffic between the core network 1, the relay terminal device 1 and the server 1 at Maritime vessel 1.

Similarly, the relay terminal device 2 at Maritime vessel 2 can access the base station 1 at Maritime vessel 1 and also act as an access point for other terminal device(s) at Maritime vessel 2. The relay terminal device 2 can be configured not to access the base station 2. The relay terminal device 2 can also relay traffic between the core network 2 or the server 2 at Maritime vessel 2 and the core network 1 or the server 1 at Maritime vessel 1. The router 2 at Maritime vessel 2 can route traffic between the core network 2, the relay terminal device 2 and the server 2 at Maritime vessel 2.

Likewise, the relay terminal device 3 at Maritime vessel 3 can access the base station 2 at Maritime vessel 2 and also act as an access point for other terminal device(s) at Maritime vessel 3. The relay terminal device 3 can be configured not to access the base station 3. The relay terminal device 3 can also relay traffic between the core network 3 or the server 3 at Maritime vessel 3 and the core network 2 or the server 2 at Maritime vessel 2. The router 3 at Maritime vessel 3 can route traffic between the core network 3, the relay terminal device 3 and the server 3 at Maritime vessel 3. In this way, a multi-hop network can be formed with the topology and coverage being self-organized.

Figure 2:
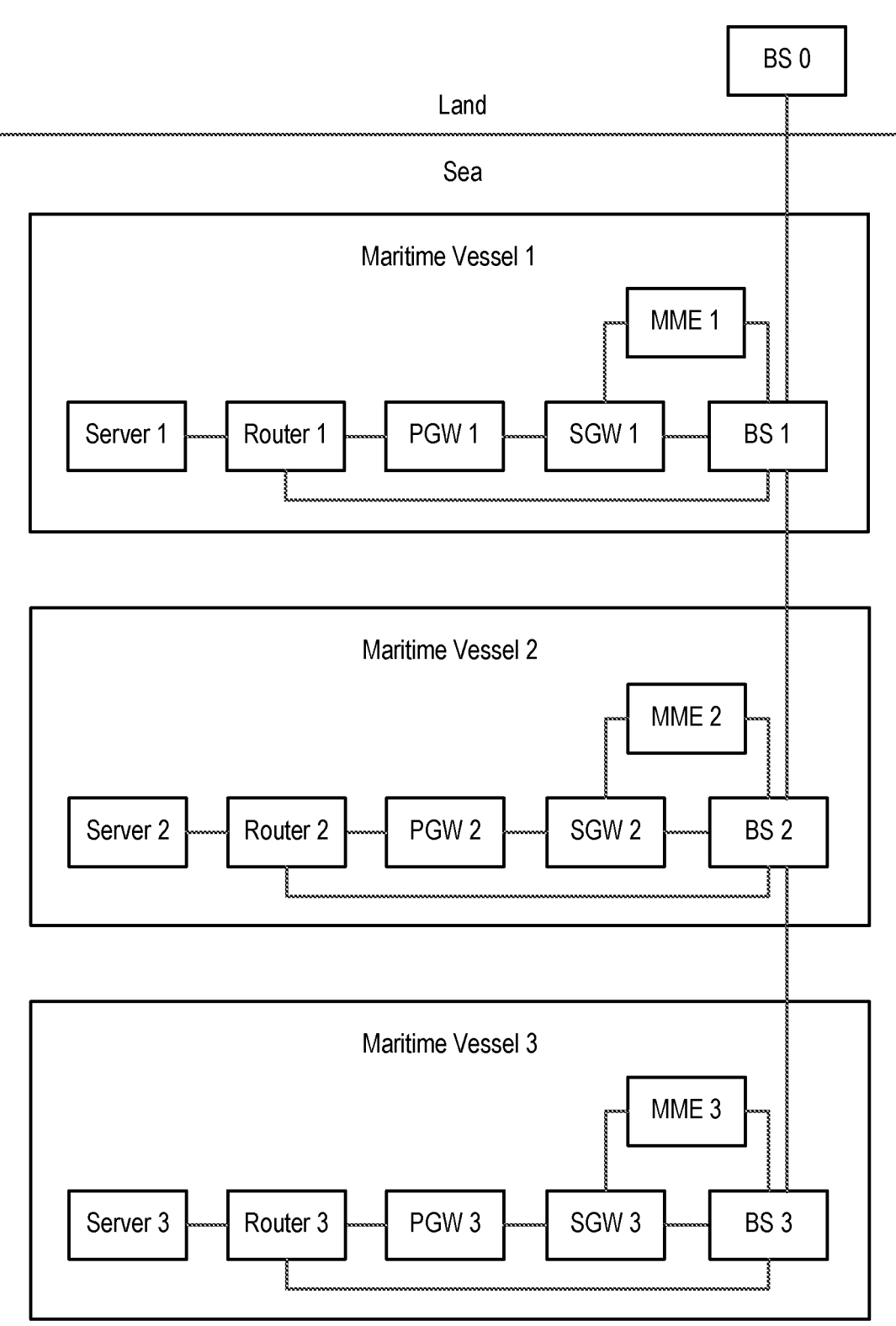
FIG. 2 is a diagram illustrating another exemplary communication system into which an embodiment of the disclosure is applicable.

Although embodiments of the disclosure will be described hereinafter with reference to FIG. 1, the present disclosure may also be applied to any other suitable maritime communication system. For example, FIG. 2 illustrates another exemplary communication system into which an embodiment of the disclosure is applicable. In this communication system, each vessel comprises a special base station and a server. The special base station owns base station functionality and user terminal functionality. The special base station in a ship can be used to set up radio connection with another special base station in another ship and the special base station can provide radio connection to the local users in the same ship and the other special base station in the other ship. Within the base stations and the core networks on the ships, the signaling and service data information can be forwarded between each other. In this way, a wireless backhaul path to the base station in terrestrial network can be set up for the special base stations in different ships and communication information can be relayed to/from terrestrial network. The servers on different ships can connect with each other via the special base stations.

The term terminal device may also be referred to as, for example, device, access terminal, user terminal, user equipment (UE), mobile station, mobile unit, subscriber station, or the like. It may refer to any end device that can access a wireless communication network and receive services therefrom. By way of example and not limitation, the terminal device may include a portable computer, an image capture terminal device such as a digital camera, a gaming terminal device, a music storage and playback appliance, a mobile phone, a cellular phone, a smart phone, a tablet, a wearable device, a personal digital assistant (PDA), or the like.

In an Internet of things (IoT) scenario, a terminal device may represent a machine or other device that performs monitoring and/or measurements, and transmits the results of such monitoring and/or measurements to another terminal device and/or a network equipment. In this case, the terminal device may be a machine-to-machine (M2M) device, which may, in a 3GPP context, be referred to as a machine-type communication (MTC) device. Particular examples of such machines or devices may include sensors, metering devices such as power meters, industrial machineries, bikes, vehicles, or home or personal appliances, e.g. refrigerators, televisions, personal wearables such as watches, and so on.

Figure 3:
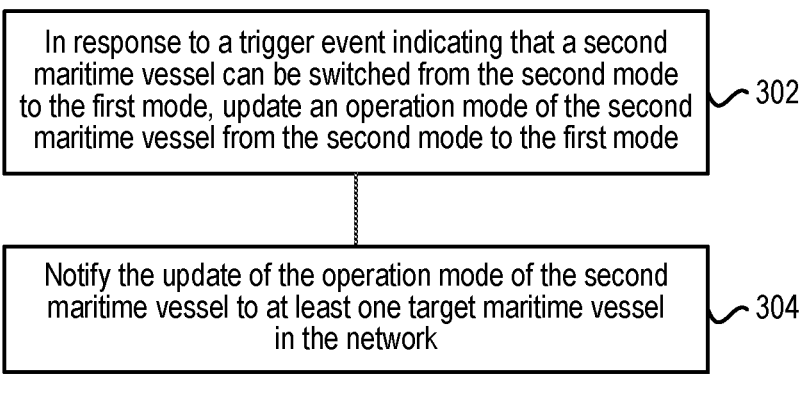
FIG. 3 is a flowchart illustrating a method performed by a management server according to an embodiment of the disclosure.

FIG. 3 is a flowchart illustrating a method performed by a management server according to an embodiment of the disclosure. The method is applicable to a network which comprises one or more first maritime vessels in a first mode where a licensed spectrum and an unlicensed spectrum can be used freely without restriction of national jurisdiction, and one or more second maritime vessels in a second mode where the use of the licensed spectrum and the unlicensed spectrum is subject to national jurisdiction. Each first maritime vessel may be provided with a first base station and a first server. Each second maritime vessel may be provided with a second base station and a second server.

At block 302, in response to a trigger event indicating that a second maritime vessel can be switched from the second mode to the first mode, the management server updates an operation mode of the second maritime vessel from the second mode to the first mode. As a first option, the management server may be a cluster comprising computing nodes distributed on at least two of the maritime vessels in the network. Although the computing nodes are not shown for the maritime vessels in FIG. 1, the computing node on a maritime vessel may be a computer which is provided separately from the server and is connected to the corresponding router shown in FIG. 1. Alternatively, the computing node and the server on this maritime vessel may be provided by the same one computer. For example, the same computer may be divided into multiple virtual machines by using virtualization techniques. One of the virtual machine may act as the server and the other virtual machine(s) may act as the computing node(s). As a second option, the management server may be a second server at the second maritime vessel.

As an example, the trigger event may be a first measurement report being received from a terminal device at the second maritime vessel which indicates a first status that a received signal quality from one of one or more first base stations at the one or more first maritime vessels is larger than a received signal quality from the terrestrial network or a second base station at another second maritime vessel by a predetermined value or more. The predetermined value may be similar to the offset value used in cell handover determination in LTE or any other suitable RAT. As another example, the trigger event may be a second measurement report being received from a terminal device at the second maritime vessel which indicates a second status that the first status has lasted for a predetermined period of time. The predetermined period of time may be configured and/or updated by an operation, administration and maintenance (OAM) via the application layer.

The terminal device may be a relay terminal device (e.g. a CPE) or any other suitable terminal device (e.g. a mobile phone of an individual user). The signal quality may be expressed as reference signal receiving power (RSRP) or reference signal receiving quality (RSRQ) or signal to interference plus noise ratio (SINR), such as cell-specific reference signal (CRS)-RSRP/RSRQ or CRS-SINR in long term evolution (LTE), synchronization signal block (SSB)-RSRP/RSRQ or SSB-SINR in new radio (NR), or channel state information reference signal (CSI-RS)-SINR or RS-SINR in sidelink, etc. The signal quality may be measured at the primary anchor frequency and/or inter-frequency/unlicensed frequency. The frequency may be expressed as E-UTRA absolute radio frequency channel number (EARFCN), NR absolute radio frequency channel number (NR-ARFCN), etc. The term E-UTRA refers to evolved UMTS terrestrial radio access and the term UMTS refers to universal mobile telecommunications system.

As an option, cell information of the neighboring cells such as the frequency configuration and cell IDs (e.g. E-UTRA cell global identifier (ECGI), NR cell global identifier (NCGI), etc.) thereof may be obtained by the second base station (e.g. eNB/gNB) at the second maritime vessel from its served terminal devices which perform radio resource control (RRC) measurement. The second base station may send the cell information of the neighboring cells to the management server so that the terminal device can obtain the cell information from the management server. With the cell information, the terminal device can perform measurement and send the above first or second measurement report when the above first or second status occurs.

As another option, the management server can obtain location information of neighboring maritime vessels from an AIS system at the second maritime vessel via location service (LCS) application layer. In addition, as described above, the management server can also obtain the cell information of the neighboring cells. Then, the management server may identify and optimize the neighboring cells corresponding to the neighboring maritime vessels and send these assistance information to the terminal device to improve the cell search efficiency and accuracy.

Alternatively, the trigger event may be the above first or second measurement report being received from the terminal device at the second maritime vessel and positioning information of the second maritime vessel indicating that the second maritime vessel is located at a first geographical area (e.g. an international waters area) where the first mode is applicable.

It is also possible that the positioning information may be a precondition to consider for determining whether to switch the second maritime vessel from the second mode to the first mode. Thus, whether to switch the second maritime vessel from the second mode to the first mode may be determined based on the above received signal qualities (from the one or more first maritime vessels and from a terrestrial network or other second maritime vessel(s)) and/or the positioning information of the second maritime vessel.

At block 304, the management server notifies the update of the operation mode of the second maritime vessel to at least one target maritime vessel in the network. In the case where the management server is a cluster, the at least one target maritime vessel may be one or more (first or second) maritime vessels in the network (more specifically, one or more servers at the one or more maritime vessels). Then the one or more maritime vessels may broadcast the notification to other maritime vessels (if any) such that all the maritime vessels in the network can obtain the notification. In the case where the management server is the second server at the second maritime vessel, the at least one target maritime vessel may be one or more other maritime vessels in the network. Similarly, broadcast may be performed such that all the maritime vessels in the network can obtain the notification. With the method of FIG. 3, it is possible to automatically and effectively switch a second maritime vessel from the second mode to the first mode.

Figure 4A:
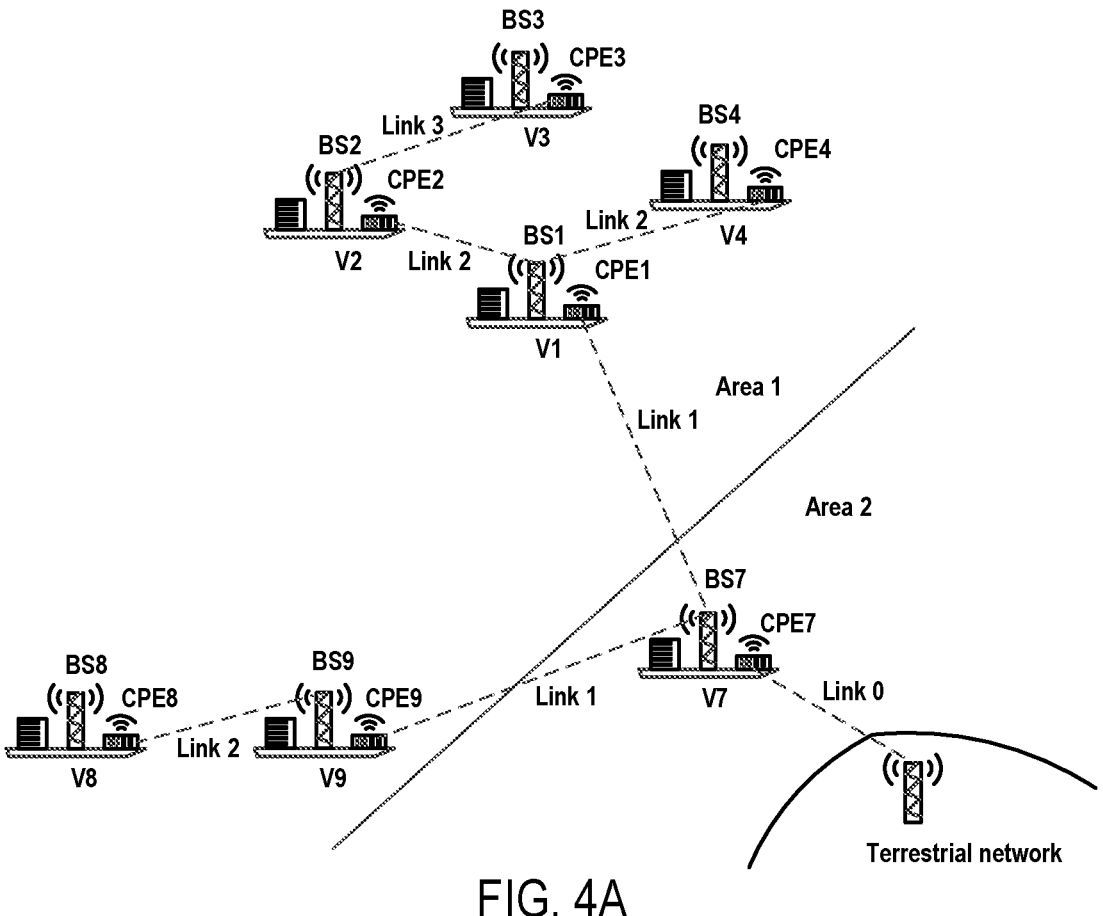
FIGS. 4A-4B are diagrams each illustrating an exemplary maritime communication network.
Figure 4B:
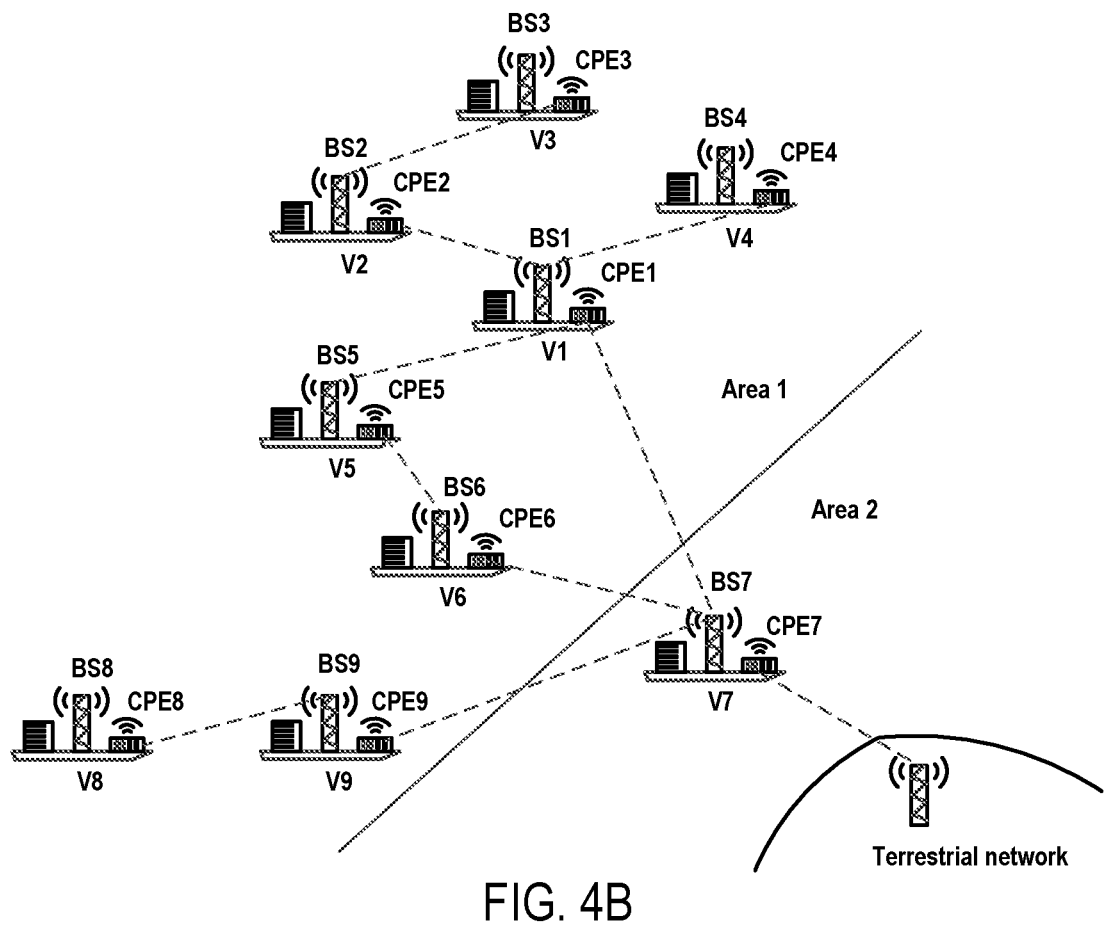

For ease of understanding of the method of FIG. 3, FIG. 4A illustrates an exemplary maritime communication network. As shown, the network comprises seven maritime vessels each of which is provided with a base station, a CPE and a mesh server. The maritime vessels V1, V2, V3, V4, V8 and V9 are located in Area 1 where the first mode is applicable and thus are first maritime vessels. The maritime vessel V7 is located in Area 2 where the second mode is applicable and thus is a second maritime vessel. The maritime vessel V7 is connected directly to the terrestrial network through CPE 7. According to the method of FIG. 3, if CPE 7 detects that the received signal quality from BS 9 or BS 1 (e.g. an inter-frequency/inter-RAT/neighboring cell) is larger than the received signal quality from the terrestrial network by a predetermined value or more, CPE 7 may trigger a measurement report to its serving mesh server and other endpoint mesh servers connected with the serving mesh server. Then, this notification may be forwarded and broadcast in the application layer to all the connected mesh servers. Then, all the connected mesh servers may update its neighboring mesh nodes table with this new information (addition or deletion). The serving mesh server of CPE 7 may reconfigure new spectrum and frequencies according to the method of FIG. 6 which will be described later.

Figure 5:
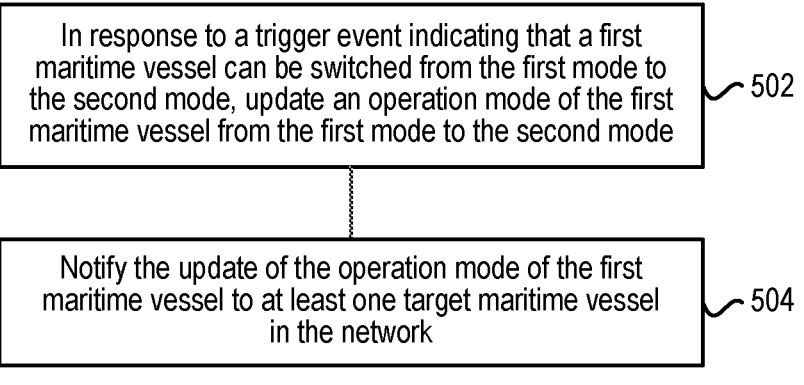
FIG. 5 is a flowchart illustrating a method performed by a management server according to an embodiment of the disclosure.

FIG. 5 is a flowchart illustrating a method performed by a management server according to an embodiment of the disclosure. The method is applicable to a network which comprises two or more first maritime vessels in a first mode where a licensed spectrum and an unlicensed spectrum can be used freely without restriction of national jurisdiction, and one or more second maritime vessels in a second mode where the use of the licensed spectrum and the unlicensed spectrum is subject to national jurisdiction. Each first maritime vessel may be provided with a first base station and a first server. Each second maritime vessel may be provided with a second base station and a second server.

At block 502, in response to a trigger event indicating that a first maritime vessel can be switched from the first mode to the second mode, the management server updates an operation mode of the first maritime vessel from the first mode to the second mode. As a first option, the management server may be a cluster comprising computing nodes distributed on at least two of the maritime vessels in the network, as described above. As a second option, the management server may be a first server at the first maritime vessel.

As an example, the trigger event may be a first measurement report being received from a terminal device at the first maritime vessel which indicates a first status that a received signal quality from one of one or more second base stations at the one or more second maritime vessels is larger than a received signal quality from a first base station at another first maritime vessel by a predetermined value or more. As another example, the trigger event may be a second measurement report being received from a terminal device at the first maritime vessel which indicates a second status that the first status has lasted for a predetermined period of time.

Alternatively, the trigger event may be the first or second measurement report being received from the terminal device at the first maritime vessel and positioning information of the first maritime vessel indicating that the first maritime vessel is located at a second geographical area (e.g. national waters area) where the second mode is applicable.

Similar to block 302, it is also possible that the positioning information may be a precondition to consider for determining whether to switch the first maritime vessel from the first mode to the second mode. Thus, whether to switch the first maritime vessel from the first mode to the second mode may be determined based on the above received signal qualities (from the one or more second maritime vessels or a terrestrial network and from other first maritime vessel(s)) and/or the positioning information of the first maritime vessel.

At block 504, the management server notifies the update of the operation mode of the first maritime vessel to at least one target maritime vessel in the network. In the case where the management server is a cluster, the at least one target maritime vessel may be one or more (first or second) maritime vessels in the network (more specifically, one or more servers at the one or more maritime vessels). Then the one or more maritime vessels may broadcast the notification to other maritime vessels (if any) such that all the maritime vessels in the network can obtain the notification. In the case where the management server is the first server at the first maritime vessel, the at least one target maritime vessel may be one or more other maritime vessels in the network. Similarly, broadcast may be performed such that all the maritime vessels in the network can obtain the notification. With the method of FIG. 5, it is possible to automatically and effectively switch a first maritime vessel from the first mode to the second mode.

For example, in the exemplary maritime network shown in FIG. 4A, according to the method of FIG. 5, if CPE 9 detects that the received signal quality from BS 7 or the terrestrial network is larger than the received signal quality from BS 8 by a predetermined value or more, CPE 9 may trigger a measurement report to its serving mesh server and other endpoint mesh servers connected with the serving mesh server. Then, this notification may be forwarded and broadcast in the application layer to all the connected mesh servers. Then, all the connected mesh servers may update its neighboring mesh nodes table with this new information (addition or deletion).

Figure 6:
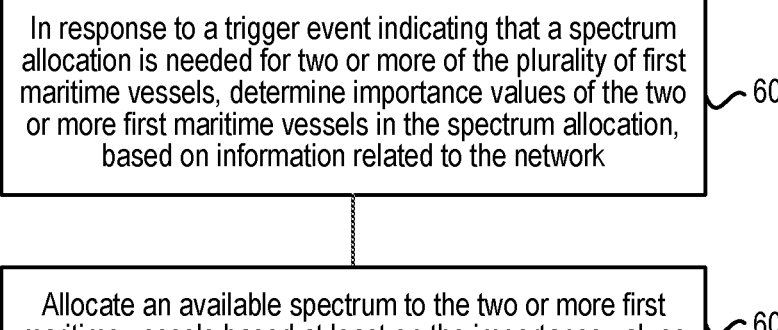
FIG. 6 is a flowchart illustrating a method performed by a management server according to an embodiment of the disclosure.

FIG. 6 is a flowchart illustrating a method performed by a management server according to an embodiment of the disclosure. The method is applicable to a network which comprises a plurality of first base stations and first servers at a plurality of respective first maritime vessels. As an exemplary scenario, the plurality of first maritime vessels may be in a first mode where a licensed spectrum and an unlicensed spectrum can be used freely without restriction of national jurisdiction. The plurality of first maritime vessels may be connected to a terrestrial network via one or more second maritime vessels which are in a second mode where the use of the licensed spectrum and the unlicensed spectrum is subject to national jurisdiction. Thus, an available spectrum which may be allocated to any one or more of the plurality of first maritime vessels may comprise the unlicensed spectrum, and a remaining part of the licensed spectrum excluding a part that has been used by the plurality of first maritime vessels. Due to the use of the unlicensed spectrum and the additional part of the licensed spectrum, a high band wireless and service network can be provided for maritime scenarios. In particular, it can provide extra bandwidths for (e.g. eMBB) UEs' throughputs in association with multiple unused spectrums, not limited in LTE but also applicable to NR spectrums.

As a first option, the management server may be a cluster comprising computing nodes distributed on at least two of the plurality of first maritime vessels. Although the computing nodes are not shown for the maritime vessels in FIG. 1, the computing node on a first maritime vessel may be a computer which is provided separately from the first server and is connected to the corresponding router shown in FIG. 1. Alternatively, the computing node and the first server on this first maritime vessel may be provided by the same one computer. For example, the same computer may be divided into multiple virtual machines by using virtualization techniques. One of the virtual machine may act as the first server and the other virtual machine(s) may act as the computing node(s). It is also possible that the management server may be a cluster comprising computing nodes distributed on at least two of the maritime vessels in the network (e.g. distributed on at least two of the plurality of first maritime vessels and the one or more second maritime vessels). As a second option, the management server may be one of the plurality of first servers. For this option, the information required for performing the method of FIG. 6 may be synchronized to this first server (acting as the management server) from other first server(s). It is also possible that the management server may be one of the servers in the network (e.g. one of the plurality of first servers and the one or more second servers).

From the view of mesh servers and packet cores in the network, all the physical nodes on individual ships are generally considered as distributed architecture which is feasible in the maritime network. However, considering the service based interface (SBI) messages and client & server service-based applications described later, the cloud native architecture of the first option is better than the distributed architecture of the second option. In addition, in the cluster, load balance or node load sharing may be performed for score calculation and updates described later. The stability and retrievability can be better in platform level rather than application level. Cloud native technology such as Open-Stack VM and Kubernetes Container based network are also applicable for this architecture rather than some physical nodes on ships.

At block 602, in response to a trigger event indicating that a spectrum allocation is needed for two or more of the plurality of first maritime vessels, the management server determines importance values of the two or more first maritime vessels in the spectrum allocation, based on information related to the network. Examples of the trigger event may include, but not limited to: the management server receives spectrum requests from the first servers at the two or more first maritime vessels; at least one of the importance values of the two or more first maritime vessels is changed by a predetermined threshold or more after a spectrum allocation is finished; and the number of the plurality of first maritime vessels is increased or decreased after a spectrum allocation is finished.

For example, the information related to the network may comprise positioning information of the plurality of first maritime vessels. Examples of the positioning information may include, but not limited to, geographical location information such as global navigation satellite system (GNSS) information, moving status such as speed and direction (e.g. heading), distance between ships, and the like. The positioning information may be obtained from an AIS deployed at the first maritime vessel. It is also possible that the information related to the network may comprise positioning information of the plurality of first maritime vessels and the one or more second maritime vessels.

As another example, the information related to the network may comprise spectrum request information of the two or more first maritime vessels. Examples of the spectrum request information may include, but not limited to, requested spectrum bandwidth, information about whether lower frequency or higher frequency is requested, and the like. The spectrum request information may be obtained from the first base stations at the two or more first maritime vessels.

As yet another example, the information related to the network may comprise service request information of the two or more first maritime vessels. The service request information may comprise QoS (e.g. 5th generation (5G) QoS identifier (5QI)) requested by the two or more first maritime vessels. The service request information may be obtained from the core networks at the two or more first maritime vessels.

As yet another example, the information related to the network may comprise available spectrum information indicating the available spectrum for the two or more first maritime vessels. As mentioned above, in the case where the plurality of first maritime vessels are in the first mode, the available spectrum may comprise the unlicensed spectrum, and a remaining part of the licensed spectrum excluding a part that has been used by the plurality of first maritime vessels. In addition, whenever a spectrum allocation has been performed for any one or more of the plurality of first maritime vessels, the available spectrum may be updated by subtracting the spectrum that has been allocated.

As yet another example, the information related to the network may comprise chain information related to chains extending from the two or more first maritime vessels to a second maritime vessel that is connected directly to the terrestrial network. Examples of the chain information may include, but not limited to: topology information of chain(s) extending from the first maritime vessel to the second maritime vessel that is connected directly to the terrestrial network (or simply referred to as the root node on the chain(s)); historical (e.g. enhanced mobile broadband (eMBB)) traffic throughput information related to the chain(s); the bandwidth allowed by the chain(s), and the historical scores (the fifth scores and/or the sixth scores) of the chain(s) described later. For example, the topology information of the chain(s) may comprise Cell IDs of respective maritime vessels (or simply referred to as nodes) on the chain(s), connection status information indicating link relationship between respective nodes on the chain(s), and the like. To obtain the topology information, every base station (or server) of the network may share its cell ID and link relationship (relative to the connected maritime vessel(s)) with other base stations (or servers). The historical traffic throughput information may be obtained from the base stations at respective nodes on the chain(s).

As yet another example, the information related to the network may comprise any combination of the positioning information, the spectrum request information, the service request information, the available spectrum information and the chain information.

Figure 7:
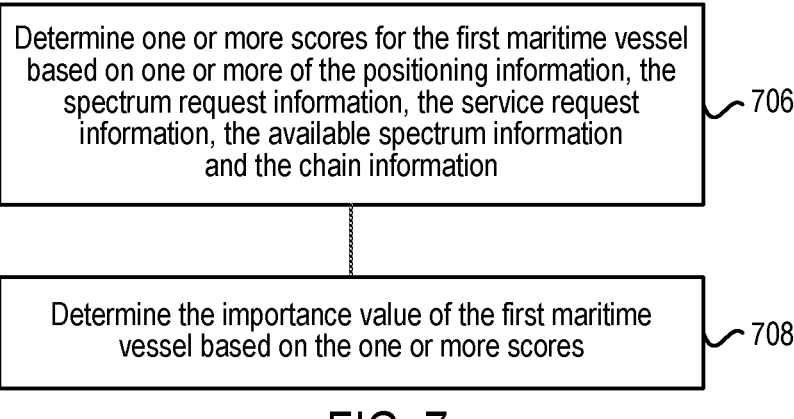
FIG. 7 is a flowchart for explaining the method of FIG. 6.

For a first maritime vessel which may be any one of the two or more first maritime vessels, block 602 may be implemented as blocks 706-708 of FIG. 7. At block 706, the management server determines one or more scores for the first maritime vessel based on one or more of the positioning information, the spectrum request information, the service request information, the available spectrum information and the chain information. At block 708, the management server determines the importance value of the first maritime vessel based on the one or more scores.

In a case where the positioning information comprising geographical locations and moving status of the plurality of first maritime vessels is used, block 706 may comprise block 810 of FIG. 8. At block 810, the management server determines, based on the positioning information, a first score that reflects an approaching degree between the first maritime vessel and other first maritime vessels (e.g. the remaining first maritime vessels). For example, the smaller the geographical distance between the first maritime vessel and another first maritime vessel is, the higher the approaching degree therebetween is. Similarly, the smaller the difference between moving directions of the first maritime vessel and another first maritime vessel is, the higher the approaching degree therebetween is. Correspondingly, at block 708, the higher the approaching degree is, the larger the determined importance value of the first maritime vessel is. Note that this relationship is mentioned in a sense that other conditions remain the same.

As an exemplary example, the first score $S_k1$ for node k ship (reference ship) may be expressed as:

$$S_k1 = \frac{-1}{\sqrt{\sum_{t=1}^{N}\left(\bar{\omega}_k^{(i)}\log\bar{\omega}_k^{(i)}\right)^2}}\sum_{i=1}^{N}\bar{\omega}_k^{(i)}\log\bar{\omega}_k^{(i)},$$

$$\bar{\omega}_k^{(i)} = \alpha\left\|D\left(\vec{w}_k^{lat,log}-\vec{w}_i^{lat,log}\right)\right\| + \beta\left\|S(\vec{w}_k-\vec{w}_i)\right\|,$$

where $\vec{w}_k^{lat,log}$ is a vector containing the latitude and longitude of node k ship, $\vec{w}_i^{lat,log}$ is a vector containing the latitude and longitude of node i ship, $\vec{w}_k$ is an instantaneous speed vector of node k ship, $\vec{w}_i$ is an instantaneous speed vector of node i ship, D( ) and S( ) are scalar performance functions between node k ship and node i ship, D( ) can calculate a vector between node k ship and node i ship and transform this vector expressed in latitude and longitude to a vector expressed in rectangular plane coordinates, S( ) can calculate an instantaneous speed vector between node k ship and node i ship, ‖ ‖ represents the norm of a vector, α and β are weighting factors for distance and speed respectively. The parameter N is the number of the remaining first maritime vessels (or the remaining first ships) in the network. Thus, $S_k1$ represents an overall score that is scored by the reference ship for the remaining first ships in the aspects of geographical distance and relative moving direction when the remaining first ships are viewed by the reference ship. This means the first score is a node level score.

It is also possible that the first score may reflect an approaching degree between the first maritime vessel and other maritime vessels (e.g. the remaining maritime vessels) in the network. The "other maritime vessels" mentioned here can cover both first maritime vessels and second maritime vessels. For example, suppose that vessel V1 is in ocean mode and vessel V2 is in off-shore mode. When vessel V1 requests other vessels for additional bandwidth, vessel V1 can select vessel V2 for this purpose. If vessel V1 gets an opportunity of being allocated with an additional bandwidth according to the importance value of vessel V1, and if vessel V2 can support the additional bandwidth requested by vessel V1, then the spectrum allocation for vessel V1 succeeds.

In a case where the spectrum request information comprising spectrum bandwidths requested by the two or more first maritime vessels is used, block 706 may comprise block 812 of FIG. 8. At block 812, the management server determines, based on the spectrum request information, a second score that reflects a spectrum bandwidth requested by the first maritime vessel. Thus, the second score is a node level score. For example, the second score S2 may be calculated by using a function which monotonically increases with the requested bandwidth. Correspondingly, at block 708, the larger the requested bandwidth is, the larger the determined importance value of the first maritime vessel is.

In a case where the service request information comprising QoS requested by the two or more first maritime vessels is used, block 706 may comprise block 814 of FIG. 8. At block 814, the management server determines, based on the service request information, a third score that reflects QoS requested by the first maritime vessel. Thus, the third score is a node level score. For example, the third score S3 may be calculated by using a function which monotonically increases with the requested QoS. Correspondingly, at block 708, the higher the requested QoS is, the larger the determined importance value of the first maritime vessel is.

In a case where the positioning information and the spectrum request information mentioned above are used, block 706 may comprise block 816 of FIG. 8. At block 816, the management server determines, based on the positioning information and the spectrum request information, a fourth score that reflects a priority of the first maritime vessel in terms of requested frequency. For example, when a ship requesting a smaller bandwidth of lower frequency is compared with a ship requesting a larger bandwidth of higher frequency, the fourth score and the second score may be calculated for the two ships respectively to perform an overall comparison based on the two scores. The requested frequency may be expressed as an EARFCN or NR-ARFCN, for example. Thus, the fourth score may be a node-to-node xARFCN level score. The fourth score S4 may be calculated based on a pathloss at the requested frequency between the first maritime vessel and other first maritime vessel(s) served by the first maritime vessel. The pathloss may be estimated based on a geographical pathloss model which may be a function of the distance between the maritime vessels and the requested frequency. Correspondingly, at block 708, the higher the priority of the first maritime vessel is (the lower the pathloss is), the larger the determined importance value of the first maritime vessel is.

In a case where the chain information for the first maritime vessel is used, block 706 may comprise block 818 of FIG. 8. The chain information for the first maritime vessel may comprise: topology of chain(s) extending from the first maritime vessel to the second maritime vessel that is connected directly to the terrestrial network (or the root node of the chain(s)); and historical traffic throughput information related to the chain(s). At block 818, the management server determines, based on the chain information, a fifth score derived at least from historical traffic throughput(s) of the chain(s) excluding the first maritime vessel. Thus, the fifth score is a chain level score. Note that the expression "historical traffic throughput(s) of the chain(s)" can mean: "a historical traffic throughput of the chain" in the case where the number of chains is one; and "historical traffic throughputs of the chains" in the case where the number of chains is more than one. As an example, the fifth score S5 may be expressed as:

$$S5 = \sum_{j=1}^{n} S5_j,$$

where j is the index of the chain and is unique in the network, $S5_j$ is the sum of historical traffic throughputs on respective maritime vessels on the j-th chain excluding the first maritime vessel and n is the number of the chain(s). As another example, the fifth score S5 may be expressed as:

$$S5 = \sum_{j=1}^{n} S5_j,$$

$$S5_j = \frac{\text{Historical Spectrum efficiency of Chain } j * \text{Spectrum(to be allocated for new node)}}{\text{Histotical Throuput of Chain } j}$$

The historical spectrum efficiency of chain j may be calculated as:

$$\sum_{l=0}^{m} w_l \frac{\text{Througput of Node}_l}{\text{Bandwidth}_l(\text{Allocated Node})}.$$

where l is the index of the maritime vessel on the chain, m is the number of the maritime vessels on the chain excluding the first maritime vessel and may vary from chains, $w_l$ is the weight for node l and the sum of these weights is 1. As yet another example, a sum of historical spectrum efficiency(ies) of the chain(s) excluding the first maritime vessel may be used as the fifth score. That is, $S5_j$ in this example is the historical spectrum efficiency of chain j excluding the first maritime vessel. Note that the expression "a sum of historical spectrum efficiency(ies) of the chain(s)" can mean: "a historical spectrum efficiency of the chain" in the case where the number of chains is one; and "a sum of historical spectrum efficiencies of the chains" in the case where the number of chains is more than one. As yet another example, a sum of estimated throughputs of the first maritime vessel which are based on the historical spectrum efficiency(ies) of the chain(s) excluding the first maritime vessel may be used as the fifth score. That is, $S5_j$ in this example is the estimated throughput of the first maritime vessel which is based on the historical spectrum efficiency of chain j excluding the first maritime vessel. Correspondingly, at block 708, the larger the sum is, the larger the determined importance value of the first maritime vessel is.

In a case where the chain information for the first maritime vessel is used and there are multiple chains, block 706 may comprise blocks 820 of FIG. 8. In this case, the chain information for the first maritime vessel may comprise: topology of multiple chains extending from the first maritime vessel to the second maritime vessel that is connected directly to the terrestrial network; and historical traffic throughput information related to the multiple chains. At block 820, the management server determines, based on the chain information, a sixth score that reflects an importance degree of a chain that is to be selected by the first maritime vessel from the multiple chains. For example, in the exemplary maritime network shown in FIG. 4B, the maritime vessel V1 has two chains to the maritime vessel V7 (the root node). The first chain is from V1 to V7 and the second chain is from V1 to V5 to V6 to V7. Suppose that the importance degree of the first chain is 0.1 and the importance degree of the second chain is 0.2. Then, the second chain having the larger importance degree is to be selected by the maritime vessel V7. If two chains have the same importance degree, the maritime vessel may select either one of them (e.g. in a random manner). For example, an importance degree of a chain from the multiple chains may be determined such that the larger a predetermined metric of the chain is, the less frequently the chain is selected. Examples of the predetermined metric may include, but not limited to, a historical traffic throughput of the chain excluding the first maritime vessel; a historical spectrum efficiency of the chain excluding the first maritime vessel; an estimated throughput of the first maritime vessel which is based on the historical spectrum efficiency of the chain excluding the first maritime vessel; and a ratio between the estimated throughput of the first maritime vessel and the historical traffic throughput of the chain excluding the first maritime vessel.

As an exemplary example, $S5_j$ described above may be used as the predetermined metric. Then, the importance degree $W6_j$ of chain j may be calculated with a correction factor $Delta6_j$ as shown below:

$$Delta6_j = 0.1 * S5_j,$$

$$W6_j = W6_j - Delta6_j \text{ if chain } j \text{ is selected for access of the new node.}$$

Note that the importance degrees for other chains do not change if chain j is selected for access of the new node. The initial value for $W6_j$ may be a system configurable parameter. For example, the initial values for the multiple chains may be equal to or different from each other. In the latter case, the initial values for the multiple chains may be proportional to $S5_j$. Also note that 0.1 is merely an exemplary example for illustration purpose but not for limitation.

At block 824, the management server determines, as a six score, the weight for the chain selected by the first maritime vessel. Thus, the sixth score is a chain level score. Correspondingly, at block 708, the larger the sixth score is, the larger the determined importance value of the first maritime vessel is.

In a case where more than one of the above six scores is determined at block 706, the importance value of the first maritime vessel may be determined at block 708 by using a function that satisfies simultaneously the relationships between the more than one score and the importance value as described above. As an exemplary example, suppose that: the higher the above approaching degree is, the larger the first score is; the larger the requested bandwidth is, the larger the second score is; the higher the requested QoS is, the larger the third score is; the larger the above pathloss is, the larger the fourth score is; the larger the above sum is, the larger the fifth score is; and the larger the above weight for the selected chain is, the larger the sixth score is. Then, in a case where the six scores are used, the importance value $S_{client}$ of the first maritime vessel may be expressed as:

$$S_{client} = \frac{S_k 1 \cdot S2 \cdot S3 \cdot S5 \cdot S6}{S4}.$$

Referring back to FIG. 6, at block 604, the management server allocates an available spectrum to the two or more first maritime vessels based at least on the importance values. The available spectrum has been described above and its details are omitted here. For example, block 604 may be implemented as blocks 922-926 of FIG. 9. At block 922, the management server determines bandwidths of portions of the available spectrum which are to be allocated to the two or more first maritime vessels, based on the importance values. For example, the bandwidth of the portion to be allocated to a first maritime vessel may be determined as: a bandwidth of the available spectrum multiplied by a ratio between the importance value of the first maritime vessel and a sum of the importance values of the two or more first maritime vessels. This may be expressed as:

$$B_i = \left( \frac{S_{client\_i}}{\left\| \sum_{i=1}^{m} S_{client\_i} \right\|} \right) * \text{Spectrum}$$

Table(unallocated Bandwidth in *CLusterDB*), where $S_{client\_i}$ is the importance value of the i-th first maritime vessel among the two or more first maritime vessels, m is the number of two or more first maritime vessels, CLusterDB refers to the database of the cluster, and $B_i$ is the bandwidth of the portion to be allocated to the i-th first maritime vessel.

As an exemplary example, in a case where all the first maritime vessels in a whole chain in the first geographical area need spectrum allocation, the total available spectrum may be split to N segments, where N is the number of these first maritime vessels. The bandwidth of each segment may depend on the importance value of each maritime vessel. The chain may be defined as the last trunk to the root node which connects to the terrestrial network.

At block 924, the management server determines positions of the portions in the available spectrum based on one or more predetermined rules. The one or more predetermined rules may comprise at least one of: (1) lower frequency bands are preferentially selected for spectrum allocation; (2) larger bandwidths are preferentially considered in spectrum allocation; (3) continuous frequency bands are preferentially selected for spectrum allocation; (4) in a case where no continuous frequency band is left, frequency band(s) having been allocated are reused to form a continuous frequency band; (5) fragmental frequency bands are utilized as much as possible; and (7) spectrum collision is avoided for less interference in frequency. In the case where the rule (4) is used, soft frequency network techniques may be used. For example, details of the soft frequency network techniques may be obtained from: "Adaptive Soft Frequency Reuse for Inter-Cell Interference Coordination in SC-FDMA Based 3GPP LTE Uplinks" (Published in: IEEE GLOBE-COM 2008-2008 IEEE Global Telecommunications Conference, Date of Conference: 30 Nov.-4 Dec. 2008); and "Soft Frequency Reuse in the Uplink of an OFDMA Network" (Published in: 2010 IEEE 71st Vehicular Technology Conference, Date of Conference: 16-19 May 2010). Note that rule (4) and rule (7) conflict with each other and cannot be used simultaneously.

At block 926, the management server sends information related to the determined bandwidths and positions of the portions to the first servers at the two or more first maritime vessels. For example, for each of the two or more first maritime vessels, only the information about the bandwidth and position corresponding to this maritime vessel may be sent to the corresponding first server at this first maritime vessel. Then such information may be delivered to a requesting terminal device via the serving cell using anchor frequency node.

As an exemplary example, FIG. 10 illustrates a process of spectrum allocation according to an embodiment of the disclosure. Suppose that spectrum requests from three ships (also referred to as Client 1, Client 2 and Client 3) come to the management server within a predetermined time period. So they are handled together. Also suppose that the whole spectrum is divided into 14 segments and segments 4, 5, 8, 11 and 12 have been allocated. So the unallocated segments 1-3, 6-7, 9-10 and 13-14 are available for spectrum allocation. Also suppose that Client 1 requests to allocate 2 segments, and each of Client 2 and Client 3 requests to allocate 3 segments. Then, according to the above rule (1), the spectrum allocation starts from the lower frequency band. According to the above rule (2), the bandwidth requested by each of Client 2 and Client 3 is larger than the bandwidth requested by Client 1, spectrum allocation is preferentially performed for Client 2 and Client 3. Since the spectrum request from Client 2 comes earlier than the spectrum request from Client 3, segments 1-3 are allocated to Client 2 and segments 6-7 are allocated to Client 3. Then, according to the above rules (1) and (3), segments 9-10 are allocated to Client 1 and segment 13 is further allocated to Client 3.

Note that FIG. 10 merely shows a sufficient spectrum scenario for explaining the spectrum allocation rules. Besides this scenario, there may be an insufficient spectrum scenario where the requested bandwidths are larger than the bandwidth of the available spectrum. In this case, in the increasing order of frequencies, respective continuous frequency bands can be allocated to the requesting clients in a manner that the spectrum request from the client having a higher importance value is preferentially satisfied. This may be implemented similarly to proportional fairness (PF) scheduling algorithm.

Figure 11:
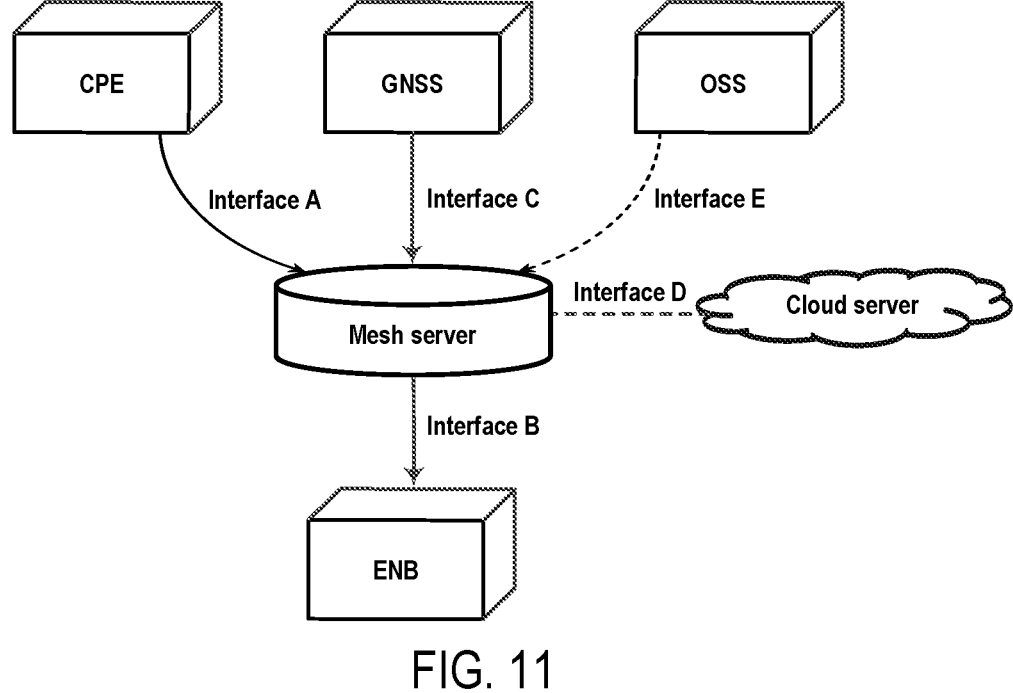
FIG. 11 is a diagram illustrating the interfaces between different entities in a communication system according to an embodiment of the disclosure.

FIG. 11 is a diagram illustrating the interfaces between different entities in a communication system according to an embodiment of the disclosure. As shown, in this example, a maritime vessel is provided with an evolved node B (eNB), a mesh server, a CPE, a GNSS and an operation support system (OSS). A cloud server is distributed in the communication system such as shown in FIG. 1 or FIG. 2. The mesh server may communicate with (e.g. receive measurement information from) the CPE's application layer through Interface A. The mesh server may communicate with (e.g. send a command to) the eNB through Interface B. The mesh server may communicate with (e.g. receive geographical information via LCS application from) the GNSS through Interface C. The mesh server may communicate with the cloud server through Interface D which may be called a mesh service interface. The mesh server may communicate with the OSS through Interface E to configure the mesh server, for example.

Figure 12:
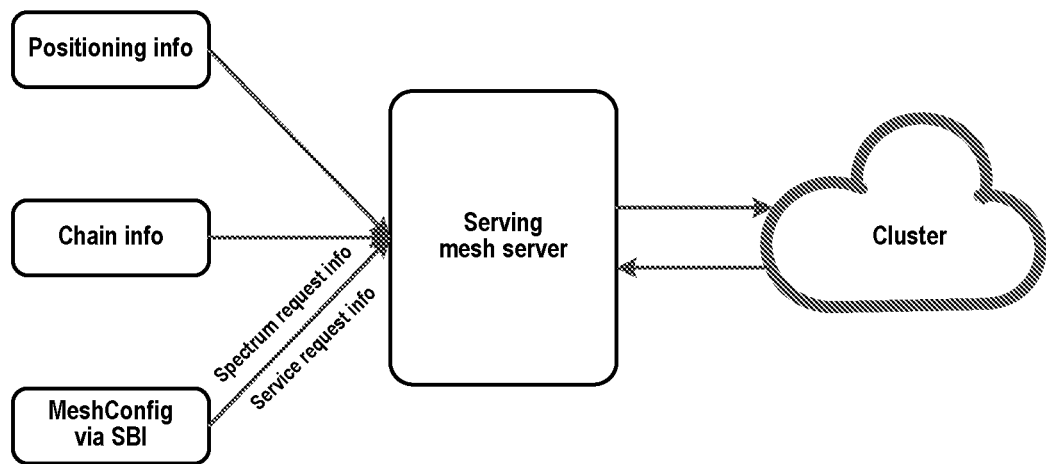
FIG. 12 is a diagram illustrating an exemplary process according to an embodiment of the disclosure.

FIG. 12 is a diagram illustrating an exemplary process according to an embodiment of the disclosure. As shown, the serving mesh server may obtain the positioning information and the chain information described above. The serving mesh server may also obtain the spectrum request information and the service request information described above through Interface B, by MeshConfig via SBI which will be described later. The mesh server may send a spectrum allocation request to the cluster through Interface D. By performing the method of FIG. 6, the cluster may send a spectrum allocation response containing a grant of node spectrum to the serving mesh server.

Figure 13:
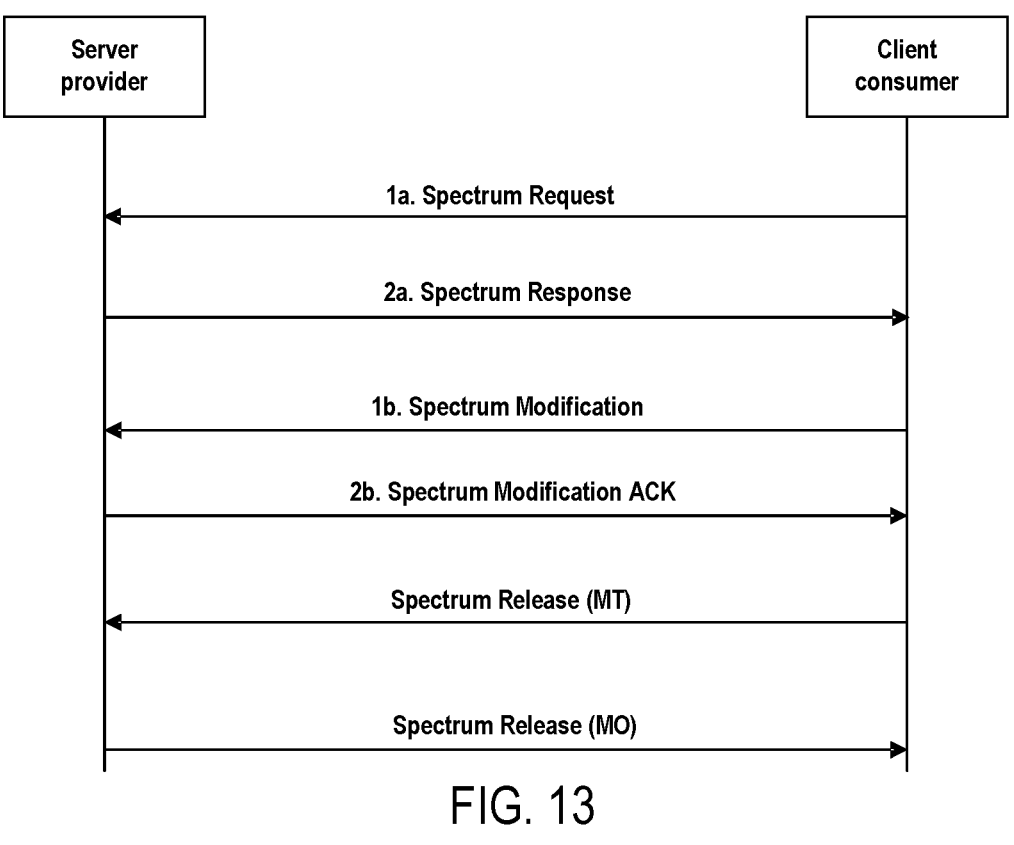
FIG. 13 is a diagram illustrating exemplary interactions between a server provider and a client consumer according to an embodiment of the disclosure.

As an exemplary example for implementing the solution of the disclosure, in the Ocean mode or Ocean Area, in order for a vessel to switch to some unlicensed spectrums based on the anchor frequency from the Offshore mode or Offshore Area, the vessel keeps at least one anchor frequency spectrum from Offshore Area/Mode. The candidate unlicensed spectrum list is broadcasted to every mesh node via mesh application layer during every mesh communication opportunities such as (vessel mode switch events, vessel spectrum request events, etc.). Once a specific vessel requests additional spectrum, the mesh service request includes itself and its previous hop nodes/chain information as following: (1) Selected Frequency (EARFCN, NR-ARFCN) by CPE/UE after network configuration; (2) Total bandwidth; (3) QoS/5QCI information; (4) Route Information (data network name (DNN)/access point name (APN) Internet protocol (IP) addresses). The application protocol may be SBI hypertext transfer protocol (HTTP)/HTTPs in 5th generation (5G) or stream control transmission protocol (SCTP)/GPRS tunnel protocol user plane (GTP-U) in 4th generation (4G). The term GPRS refers to general packet radio service. As shown in FIG. 13, the application layer messages between Client and Server may include: request/response and Modification/Ack which are bi-directional; and release messages which are single directional and include mobile terminated (MT) or mobile originated (MO) release.

The changes made to SBI definition of 3GPP technical specification (TS) 29.5xx may be as follows.

1.1 Structured Data Types

Type: MeshNodeConfig

The purpose of the Mesh Node Configuration element is to provide the hopping Node capabilities and configuration of mesh server chains of serving node.

TABLE 1

| Definition of type MeshNodeConfig | | | | |
|---|---|---|---|---|
| Attribute name | Data type | | Cardinality | Description |
| Max Mesh Node Numbers | Uinteger | M | INTEGER (0 . . . 255) | |
| Max Mesh Node hops | Uinteger | M | INTEGER (0 . . . 127) | |
| Max Mesh Hop depths | Uinteger | M | INTEGER (0 . . . 127) | |
| >Mesh Node Level1 numbers | Uinteger | M | INTEGER (0 . . . 127) | |
| >Mesh Node Level1 | | M | | |
| >>Request Bandwidth List | Array(Bandwidth) | M | 1 . . . N | Refers to Maximum transmission bandwidth configuration in TS38.101 |
| >>Allowed Bandwidth List | Array(Bandwidth) | M | 1 . . . N | Refers to Maximum transmission bandwidth configuration in TS38.101 |
| >> Request EARFCN List | Array(EARFCN) | M | 1 . . . N | Corresponds to $N_{DL}$ for FDD and $N_{DL/UL}$ for TDD in ref. TS 36.104/TS38.101. |
| >> Request NR-ARFCN List | Array(NR-ARFCN) | M | 1 . . . N | Corresponds to $N_{DL}$ for FDD and $N_{DL/UL}$ for TDD in ref. TS 36.104/TS38.101. |
| >>Allowed EARFCN List | Array(EARFCN) | M | 1 . . . N | Corresponds to $N_{DL}$ for FDD and $N_{DL/UL}$ for TDD in ref. TS 36.104/38.101. |
| >> Allowed NR-ARFCN List | Array(NR-ARFCN) | M | 1 . . . N | Corresponds to $N_{DL}$ for FDD and $N_{DL/UL}$ for TDD in ref. TS 36.104/38.101. |
| >>RouteInformation List | Array (RouteInformation) | M | 1 . . . N | Include previous hops APN/DNN IP addresses information , Refer to TS 29,571 Type: RouteInformation |
| >> SubscribedDefaultQos List | Array(Subscribed DefaultQos) | M | 1 . . . N | |
| . . . | . . . | | . . . . . . | . . . |
| >MESH Node Level2 numbers | | O | NTEGER (0 . . . 127) | |
| >MESH Node Level2 | | | | |
| . . . | | | | |
| >MESH Node Level3 numbers | | O | NTEGER (0 . . . 127) | |
| >MESH Node Level3 | | | | |
| . . . | | | | |

```
1.2      SBI YAML Design
1.2.1    # STRUCTURED DATA TYPES example in 29.5xx
MeshNodeConfig:
   type: object
   properties:
     MaxMeshNode Numbers:
        type: integer
        minimum: 0
        maximum: 255
     MaxMeshNodHops:
        type: integer
        minimum: 0
        maximum: 127
     MaxMeshHopDepths:
        type: integer
        minimum: 0
        maximum: 127
     required:
     - MaxMeshNodeNumbers
     - MaxMeshNodHops
     - MaxMeshHopDepth
   -RequestBandwidthList
     oneOf:
     - type: array
       items:
          $ref: '#/components/schemas/DLbandwidth
          $ref: '#/components/schemas/ULbandwidth
       minItems: 0
   -AllowedBandwidthList
     oneOf:
     - type: array
       items:
          $ref: '#/components/schemas/DLbandwidth
          $ref: '#/components/schemas/ULbandwidth
       minItems: 0
....
1.2.2   # Martime Mesh Network Services Yaml files (to be standardised):
openapi: 3.0.0
info:
 version: '1.0.0.alpha-1'
 title: Ngmesh_App
 description: |
   Ngmlc_Location Service.
   ©2020, 3GPP Organizational Partners (ARIB, ATIS, CCSA, ETSI, TSDSI, TTA, TTC).
   All rights reserved.
externalDocs:
 description: 3GPP TS 29.xxx V16.0.0; 5G System; Martime Mesh Network Services; Stage 3
 url: 'http://www.3gpp.org/ftp/Specs/archive/29_series/29.5xx/'
servers:
 - url: '{apiRoot}/ngmesh-app/v1'
   variables:
     apiRoot:
       default: https://example.com
       description: apiRoot as defined in clause 4.4 of 3GPP TS 29.501
security:
 - { }
 - oAuth2ClientCredentials:
     - ngmesh-app
paths:
 /spectrum-request:
   post:
     summary: Request spectrum of an UE
     operationId: spectrumrequest
     tags:
     - Request spectrum
     requestBody:
       content:
         application/json:
           schema:
             $ref: '#/components/schemas/InputData'
       required: true
     responses:
       '200':
         description: Expected response to a valid request
         content:
           application/json:
             schema:
               $ref: '#/components/schemas/MeshNodeConfig'
       '400':
         $ref: 'TS295xx_CommonData.yaml#/components/responses/400'
       '401':
```

-continued

```
        $ref: 'TS295xx_CommonData.yaml#/components/responses/401'
      '403':
        $ref: 'TS295xx_CommonData.yaml#/components/responses/403'
      '404':
        $ref: 'TS295xx_CommonData.yaml#/components/responses/404'
      '411':
        $ref: 'TS295xx_CommonData.yaml#/components/responses/411'
      '413':
        $ref: 'TS295xx_CommonData.yaml#/components/responses/413'
      '415':
        $ref: 'TS295xx_CommonData.yaml#/components/responses/415'
      '429':
        $ref: 'TS295xx_CommonData.yaml#/components/responses/429'
      '500':
        $ref: 'TS295xx_CommonData.yaml#/components/responses/500'
      '503':
        $ref: 'TS295xx_CommonData.yaml#/components/responses/503'
      '504':
        $ref: 'TS295xx_CommonData.yaml#/components/responses/504'
      default:
        $ref: 'TS295xx_CommonData.yaml#/components/responses/default'
/spectrum-response:
 post:
  summary: Response of an request spectrum of an UE
  operationId: spectrumresponse
  tags:
  - Response spectrum
  requestBody:
   content:
     application/json:
      schema:
        $ref: '#/components/schemas/MeshNodeConfig'
   required: true
  responses:
    '204':
      description: Expected response to a successful request
    '400':
      $ref: 'TS295xx_CommonData.yaml#/components/responses/400'
    '401:
      $ref: 'TS295xx_CommonData.yaml#/components/responses/401'
    '403':
      $ref: 'TS295xx_CommonData.yaml#/components/responses/403'
    '404:
      $ref: 'TS295xx_CommonData.yaml#/components/responses/404'
    '411':
      $ref: 'TS295xx_CommonData.yaml#/components/responses/411'
    '413':
      $ref: 'TS295xx_CommonData.yaml#/components/responses/413'
    '415':
      $ref: 'TS295xx_CommonData.yaml#/components/responses/415'
    '429':
      $ref: 'TS295xx_CommonData.yaml#/components/responses/429'
    '500':
      $ref: 'TS295xx_CommonData.yaml#/components/responses/500'
    '503':
      $ref: 'TS295xx_CommonData.yaml#/components/responses/503'
    '504':
      $ref: 'TS295xx_CommonData.yaml#/components/responses/504'
    default:
      $ref: 'TS295xx_CommonData.yaml#/components/responses/default'
/spectrum-modification:
 post:
  summary: update UE spectrum information
  operationId: Modificationspectrum
  tags:
  - Modification Spectrum
  requestBody:
   content:
     application/json:
      schema:
        $ref: '#/components/schemas/MeshNodeConfig'
   required: true
  responses:
    '204':
      description: Expected response to successful Mesh node configuration modification
    '400':
      $ref: 'TS295xx_CommonData.yaml#/components/responses/400'
    '401:
      $ref: 'TS295xx_CommonData.yaml#/components/responses/401'
```

```
      '403':
        $ref: 'TS295xx_CommonData.yaml#/components/responses/403'
      '404':
        $ref: 'TS295xx_CommonData.yaml#/components/responses/404'
      '411':
        $ref: 'TS295xx_CommonData.yaml#/components/responses/411'
      '413':
        $ref: 'TS295xx_CommonData.yaml#/components/responses/413'
      '415':
        $ref: 'TS295xx_CommonData.yaml#/components/responses/415'
      '429':
        $ref: 'TS295xx_CommonData.yaml#/components/responses/429'
      '500':
        $ref: 'TS295xx_CommonData.yaml#/components/responses/500'
      '503':
        $ref: 'TS295xx_CommonData.yaml#/components/responses/503'
      '504:
        $ref: 'TS295xx_CommonData.yaml#/components/responses/504'
      default:
        $ref: 'TS295xx_CommonData.yaml#/components/responses/default'
  /spectrum-modification-ack:
  post:
    summary: response of UE spectrum information
    operationId: Modificationspectruresponse
    tags:
    -  Modification Spectrum Response
    requestBody:
      content:
        application/json:
          schema:
            $ref: '#/components/schemas/MeshNodeConfig'
      required: true
    responses:
      '204':
        description: Expected response to successful Mesh node configuration modification ack
      '400':
        $ref: 'TS295xx_CommonData.yaml#/components/responses/400'
      '401':
        $ref: 'TS295xx_CommonData.yaml#/components/responses/401'
      '403':
        $ref: 'TS295xx_CommonData.yaml#/components/responses/403'
      '404':
        $ref: 'TS295xx_CommonData.yaml#/components/responses/404'
      '411':
        $ref: 'TS295xx_CommonData.yaml#/components/responses/411'
      '413':
        $ref: 'TS295xx_CommonData.yaml#/components/responses/413'
      '415':
        $ref: 'TS295xx_CommonData.yaml#/components/responses/415'
      '429':
        $ref: 'TS295xx_CommonData.yaml#/components/responses/429'
      '500':
        $ref: 'TS295xx_CommonData.yaml#/components/responses/500'
      '503':
        $ref: 'TS295xx_CommonData.yaml#/components/responses/503'
      '504':
        $ref: 'TS295xx_CommonData.yaml#/components/responses/504'
      default:
        $ref: 'TS295xx_CommonData.yaml#/components/responses/default'
  /spectrum-release:
  post:
    summary: release of UE spectrum information
    operationId: Releasespectrum
    tags:
    -  Release Spectrum
    requestBody:
      content:
        application/json:
          schema:
            $ref: '#/components/schemas/MeshNodeConfig'
      required: true
    responses: no response
components:
  securitySchemes:
    oAuth2ClientCredentials:
      type: oauth2
      flows:
        clientCredentials:
          tokenUrl: '{nrfApiRoot}/oauth2/token'
```

-continued

```
    scopes:
        ngmlc-loc: Access to the Nmesh_App API
  schemas:

# COMPLEX TYPES

  MeshNodeConfig:
    type: object
    properties:
      MaxMeshNodeNumbers:
        type: integer
        minimum: 0
        maximum: 255
      MaxMeshNodHops:
        type: integer
        minimum: 0
        maximum: 127
      MaxMeshHopDepths:
        type: integer
        minimum: 0
        maximum: 127
      required:
      - MaxMeshNodeNumbers
      - MaxMeshNodHops
      - MaxMeshHopDepth
    -RequestBandwidthList
      oneOf:
      - type: array
        items:
          $ref: '#/components/schemas/DLbandwidth
          $ref: '#/components/schemas/ULbandwidth
        minItems: 0
          -AllowedBandwidthList
      oneOf:
      - type: array
        items:
          $ref: '#/components/schemas/DLbandwidth
          $ref: '#/components/schemas/ULbandwidth
        minItems: 0
...
##others refers to table 1
```

1.3 Spectrum Response During Spectrum Modification in Ocean-Mode

Here is an example of spectrum modification:

| Spectrum Table at cluster | | | |
|---|---|---|---|
| Attribute name | Data type | | Cardinality |
| Connected Mesh Node Numbers | Uinteger | M | INTEGER ) (0 . . . 255 |
| Connected Chains Numbers | Uinteger | M | INTEGER (0 . . . 127) |
| Scores Node | Array(float) | M | (0, 1) 1 . . . M |
| Scores Chain | Array(float) | M | (0, 1)1 . . . K |
| >Mesh Chain 1 | Uinteger | M | INTEGER (0 . . . 127) |
| >Chain depth | Uinteger | M | INTEGER (0 . . . 127) |
| >Chain topology | Array(Mesh Node ID) | M | 1 . . . N |
| >Chain Bandwidth left | Array(Bandwidth, Uinteger): [100 MHz, 280 MHz, 150 MHz, 320 MHz, 5 . . . ] | M | 1 . . . N |
| >>Node2 Bandwidth allowed | Array(Bandwidth) | M | 1 . . . N |
| >>Node3 Bandwidth allowed | Array(Bandwidth) | M | 1 . . . N |
| >>Node4 Bandwidth allowed | Array(Bandwidth) | M | 1 . . . N |
| >>Allowed EARFCN List | Array(EARFCN) | M | 1 . . . N |

-continued

| Spectrum Table at cluster | | | |
|---|---|---|---|
| Attribute name | Data type | | Cardinality |
| >> Allowed NR-ARFCN List | Array(NR-ARFCN) | M | 1 . . . N |
| >Mesh Chain 2 | Uinteger | M | INTEGER (0 . . . 127) |
| >Chain depth | Uinteger | M | INTEGER (0 . . . 127) |
| >Chain topology | Array(Mesh Node ID) | M | 1 . . . N |
| >>Node8 Bandwidth allowed | Array(Bandwidth) | M | 1 . . . N |
| >>Node9 Bandwidth allowed | Array(Bandwidth) | M | 1 . . . N |
| >>Allowed EARFCN List | Array(EARFCN) | M | 1 . . . N |
| >> Allowed NR-ARFCN List | Array(NR-ARFCN) | M | 1 . . . N |
| >>RouteInformation List | Array (RouteInformation) | M | 1 . . . N |
| >> SubscribedDefaultQos List | Array(Subscribed DefaultQos) | M | 1 . . . N |
| . . . | . . . | . . . . . . |

If score of Client from Spectrum Modification Sj<Si<Sk, Spectrum cluster would assign its applied bandwidth. Then:

| Attribute name | Data type | | Cardinality |
|---|---|---|---|
| Connected Mesh Node Numbers | Uinteger | M | N + 1 |
| Connected Chains Numbers | Uinteger | M | INTEGER (0 . . . 127) |

-continued

| Attribute name | Data type | | Cardinality |
|---|---|---|---|
| Scores Node | Array(float) | M | (0, 1) 1 . . . M + 1 |
| Scores Chain | Array(float) | M | (0, 1)1 . . . K |
| >Mesh Chain 1 | Uinteger | M | INTEGER (0 . . . 127) |
| >Chain depth | Uinteger | M | INTEGER (0 . . . 127) |
| >Chain topology | Array(Mesh Node ID, IDi) | M | 1 . . . N |
| >Chain Bandwidth left | Array(Bandwidth, Uinteger): [100 MHz, 1 80 MHz, 150 MHz, 320 MHz, 5 . . . ] | M | 1 . . . N |
| >>Node2 Bandwidth allowed | Array(Bandwidth) | M | 1 . . . N |
| >>Node3 Bandwidth allowed | Array(Bandwidth) | M | 1 . . . N |
| >>Node4 Bandwidth allowed | Array(Bandwidth) | M | 1 . . . N |
| >>Node7 Bandwidth allowed | Array(Bandwidth) | M | (100 MHz) |
| >>Allowed EARFCN List | Array(EARFCN) | M | 1 . . . N |
| >> Allowed NR-ARFCN List | Array(NR-ARFCN, ID7) | M | 1 . . . N + 1 |
| >Mesh Chain 2 | Uinteger | M | INTEGER (0 . . . 127) |
| >>RouteInformation List | Array (RouteInformation) | M | 1 . . . N |
| >> SubscribedDefaultQos List | Array(Subscribed DefaultQos) | M | 1 . . . N |
| . . . | . . . | | . . . . . . |

Figure 14:
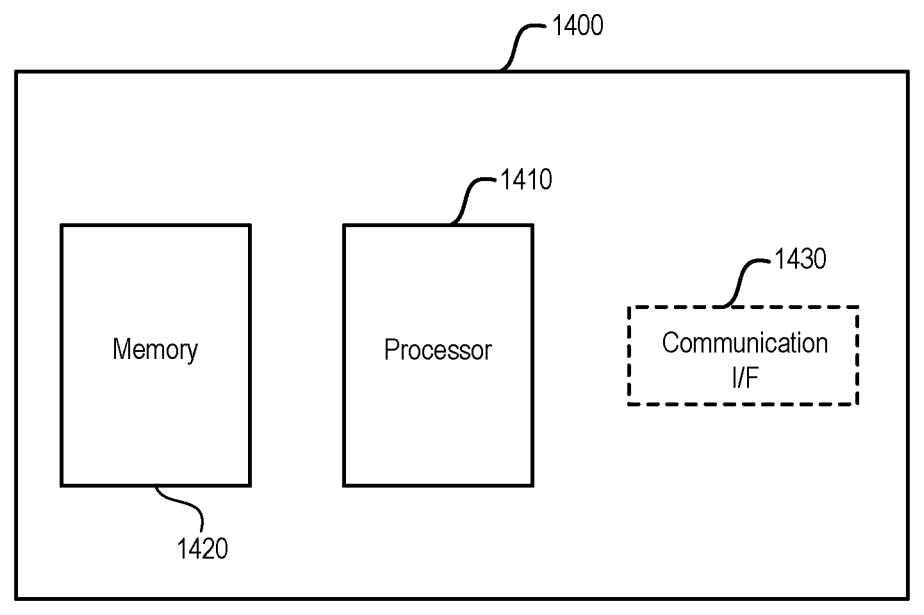
FIG. 14 is a block diagram showing an apparatus suitable for use in practicing some embodiments of the disclosure.

FIG. 14 is a block diagram showing an apparatus suitable for use in practicing some embodiments of the disclosure. For example, any one of the management server and the terminal device described above may be implemented through the apparatus 1400. As shown, the apparatus 1400 may include a processor 1410, a memory 1420 that stores a program, and optionally a communication interface 1430 for communicating data with other external devices through wired and/or wireless communication.

The program includes program instructions that, when executed by the processor 1410, enable the apparatus 1400 to operate in accordance with the embodiments of the present disclosure, as discussed above. That is, the embodiments of the present disclosure may be implemented at least in part by computer software executable by the processor 1410, or by hardware, or by a combination of software and hardware.

The memory 1420 may be of any type suitable to the local technical environment and may be implemented using any suitable data storage technology, such as semiconductor based memory devices, flash memories, magnetic memory devices and systems, optical memory devices and systems, fixed memories and removable memories. The processor 1410 may be of any type suitable to the local technical environment, and may include one or more of general purpose computers, special purpose computers, microprocessors, digital signal processors (DSPs) and processors based on multi-core processor architectures, as non-limiting examples.

Figure 15:
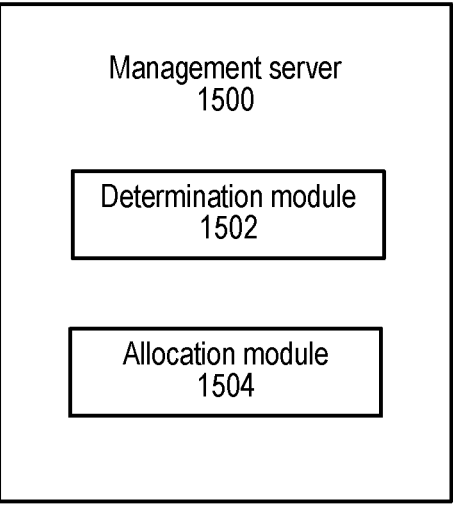
FIG. 15 is a block diagram showing a management server according to an embodiment of the disclosure.

FIG. 15 is a block diagram showing a management server according to an embodiment of the disclosure. The management server may be used in a network. The network comprises a plurality of first base stations and first servers at a plurality of respective first maritime vessels. As shown, the management server 1500 comprises a determination module 1502 and an allocation module 1504. The determination module 1502 may be configured to, in response to a trigger event indicating that a spectrum allocation is needed for two or more of the plurality of first maritime vessels, determine importance values of the two or more first maritime vessels in the spectrum allocation, based on information related to the network, as described above with respect to block 602. The allocation module 1504 may be configured to allocate an available spectrum to the two or more first maritime vessels based at least on the importance values, as described above with respect to block 604.

Figures 16, 17:
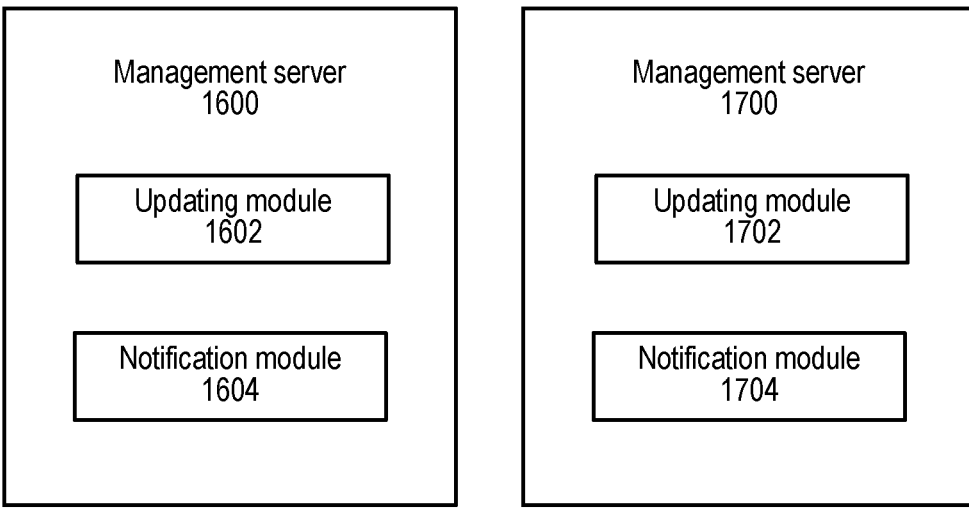
FIG. 16 is a block diagram showing a management server according to an embodiment of the disclosure.
FIG. 17 is a block diagram showing a management server according to an embodiment of the disclosure.

FIG. 16 is a block diagram showing a terminal device according to an embodiment of the disclosure. The terminal device may be used at a second maritime vessel in a network. The network comprises one or more first maritime vessels in a first mode where a licensed spectrum and an unlicensed spectrum can be used freely without restriction of national jurisdiction, and one or more second maritime vessels in a second mode where the use of the licensed spectrum and the unlicensed spectrum is subject to national jurisdiction. As shown, the terminal device 1600 comprises a determination module 1602 and a notification module 1604. The determination module 1602 may be configured to determine whether the second maritime vessel needs to be switched from the second mode to the first mode, based at least on received signal qualities from the one or more first maritime vessels and from a terrestrial network or other second maritime vessel(s) as described above with respect to block 302. The notification module 1604 may be configured to, when determining that the second maritime vessel needs to be switched from the second mode to the first mode, notify a result of the determination to a second server at the second maritime vessel as described above with respect to block 304.

FIG. 17 is a block diagram showing a terminal device according to an embodiment of the disclosure. The terminal device may be used at a first maritime vessel in a network. The network comprises two or more first maritime vessels in a first mode where a licensed spectrum and an unlicensed spectrum can be used freely without restriction of national jurisdiction, and one or more second maritime vessels in a second mode where the use of the licensed spectrum and the unlicensed spectrum is subject to national jurisdiction. As shown, the terminal device 1700 comprises a determination module 1702 and a notification module 1704. The determination module 1702 may be configured to determine whether the first maritime vessel needs to be switched from the first mode to the second mode, based at least on received signal qualities from the one or more second maritime vessels or a terrestrial network and from other first maritime vessel(s) as described above with respect to block 502. The notification module 1704 may be configured to, when determining that the first maritime vessel needs to be switched from the first mode to the second mode, notify a result of the determination to a first server at the first maritime vessel, as described above with respect to block 504. The modules described above may be implemented by hardware, or software, or a combination of both.

In general, the various exemplary embodiments may be implemented in hardware or special purpose circuits, software, logic or any combination thereof. For example, some aspects may be implemented in hardware, while other aspects may be implemented in firmware or software which may be executed by a controller, microprocessor or other computing device, although the disclosure is not limited thereto. While various aspects of the exemplary embodiments of this disclosure may be illustrated and described as block diagrams, flow charts, or using some other pictorial representation, it is well understood that these blocks, apparatus, systems, techniques or methods described herein may be implemented in, as non-limiting examples, hardware, software, firmware, special purpose circuits or logic, general purpose hardware or controller or other computing devices, or some combination thereof.

As such, it should be appreciated that at least some aspects of the exemplary embodiments of the disclosure may be practiced in various components such as integrated circuit chips and modules. It should thus be appreciated that the exemplary embodiments of this disclosure may be realized in an apparatus that is embodied as an integrated circuit, where the integrated circuit may comprise circuitry (as well as possibly firmware) for embodying at least one or more of a data processor, a digital signal processor, baseband circuitry and radio frequency circuitry that are configurable so as to operate in accordance with the exemplary embodiments of this disclosure.

It should be appreciated that at least some aspects of the exemplary embodiments of the disclosure may be embodied in computer-executable instructions, such as in one or more program modules, executed by one or more computers or other devices. Generally, program modules include routines, programs, objects, components, data structures, etc. that perform particular tasks or implement particular abstract data types when executed by a processor in a computer or other device. The computer executable instructions may be stored on a computer readable medium such as a hard disk, optical disk, removable storage media, solid state memory, RAM, etc. As will be appreciated by one of skill in the art, the function of the program modules may be combined or distributed as desired in various embodiments. In addition, the function may be embodied in whole or in part in firmware or hardware equivalents such as integrated circuits, field programmable gate arrays (FPGA), and the like.

References in the present disclosure to "one embodiment", "an embodiment" and so on, indicate that the embodiment described may include a particular feature, structure, or characteristic, but it is not necessary that every embodiment includes the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to implement such feature, structure, or characteristic in connection with other embodiments whether or not explicitly described.

It should be understood that, although the terms "first", "second" and so on may be used herein to describe various elements, these elements should not be limited by these terms. These terms are only used to distinguish one element from another. For example, a first element could be termed a second element, and similarly, a second element could be termed a first element, without departing from the scope of the disclosure. As used herein, the term "and/or" includes any and all combinations of one or more of the associated listed terms.

The terminology used herein is for the purpose of describing particular embodiments only and is not intended to limit the present disclosure. As used herein, the singular forms "a", "an" and "the" are intended to include the plural forms as well, unless the context clearly indicates otherwise. It will be further understood that the terms "comprises", "comprising", "has", "having", "includes" and/or "including", when used herein, specify the presence of stated features, elements, and/or components, but do not preclude the presence or addition of one or more other features, elements, components and/or combinations thereof. The terms "connect", "connects", "connecting" and/or "connected" used herein cover the direct and/or indirect connection between two elements.

The present disclosure includes any novel feature or combination of features disclosed herein either explicitly or any generalization thereof. Various modifications and adaptations to the foregoing exemplary embodiments of this disclosure may become apparent to those skilled in the relevant arts in view of the foregoing description, when read in conjunction with the accompanying drawings. However, any and all modifications will still fall within the scope of the non-Limiting and exemplary embodiments of this disclosure.

What is claimed is:

1. A method performed by a management server in a network, the network comprising a plurality of first base stations and first servers at a plurality of respective first maritime vessels, the method comprising:
   in response to a trigger event indicating that a spectrum allocation is needed for two or more of the plurality of first maritime vessels, determining importance values of the two or more first maritime vessels in the spectrum allocation, based on information related to the network; and
   allocating an available spectrum to the two or more first maritime vessels based at least on the importance values;
   wherein the plurality of first maritime vessels is in a first mode where a licensed spectrum and an unlicensed spectrum can be used freely without restriction of national jurisdiction; and
   wherein the plurality of first maritime vessels is connected to a terrestrial network via one or more second maritime vessels which are in a second mode where the use of the licensed spectrum and the unlicensed spectrum is subject to national jurisdiction.

2. The method according to claim 1, wherein the available spectrum comprises:
   the unlicensed spectrum; and
   a remaining part of the licensed spectrum excluding a part that has been used by the plurality of first maritime vessels.

3. The method according to claim 1, wherein the management server is a cluster comprising computing nodes distributed on at least two of the plurality of first maritime vessels.

4. The method according to claim 1, wherein the management server is one of the plurality of first servers.

5. The method according to claim 1, wherein the information related to the network comprises one or more of:
   positioning information of the plurality of first maritime vessels;
   spectrum request information of the two or more first maritime vessels;
   service request information of the two or more first maritime vessels;
   available spectrum information indicating the available spectrum for the two or more first maritime vessels; and
   chain information related to chains extending from the two or more first maritime vessels to a second maritime vessel that is connected directly to the terrestrial network.

6. The method according to claim 5, wherein determining an importance value of a first maritime vessel in the spectrum allocation comprises:
   determining one or more scores for the first maritime vessel based on one or more of the positioning information, the spectrum request information, the service request information, the available spectrum information and the chain information; and determining the importance value of the first maritime vessel based on the one or more scores.

7. The method according to claim 6, wherein the positioning information comprises geographical locations and moving status of the plurality of first maritime vessels, and wherein determining one or more scores for the first maritime vessel comprises:

determining, based on the positioning information, a first score that reflects an approaching degree between the first maritime vessel and other first maritime vessels.

8. The method according to claim 7, wherein the higher the approaching degree is, the larger the importance value of the first maritime vessel is.

9. The method according to claim 6, wherein the spectrum request information comprises spectrum bandwidths requested by the two or more first maritime vessels; and wherein determining one or more scores for the first maritime vessel comprises:

determining, based on the spectrum request information, a second score that reflects a spectrum bandwidth requested by the first maritime vessel.

10. The method according to claim 9, wherein the larger the requested bandwidth is, the larger the importance value of the first maritime vessel is.

11. The method according to claim 6, wherein the service request information comprises quality of service (QoS) requested by the two or more first maritime vessels, and wherein determining one or more scores for the first maritime vessel comprises:

determining, based on the service request information, a third score that reflects QoS requested by the first maritime vessel.

12. The method according to claim 11, wherein the higher the requested QoS, the larger the importance value of the first maritime vessel.

13. The method according to claim 6, wherein determining one or more scores for the first maritime vessel comprises:

determining, based on the positioning information and the spectrum request information, a fourth score that reflects a priority of the first maritime vessel in terms of requested frequency.

14. The method according to claim 13, wherein the higher the priority of the first maritime vessel is, the larger the importance value of the first maritime vessel is.

15. The method according to claim 6, wherein the chain information for the first maritime vessel comprises: topology of chain(s) extending from the first maritime vessel to the second maritime vessel that is connected directly to the terrestrial network; and historical traffic throughput information related to the chain(s); and wherein determining one or more scores for the first maritime vessel comprises:

determining, based on the chain information, a fifth score derived at least from historical traffic throughput(s) of the chain(s) excluding the first maritime vessel.

16. The method according to claim 15, wherein the fifth score is one of:

a sum of the historical traffic throughput(s) of the chain(s) excluding the first maritime vessel;

a sum of historical spectrum efficiency(ies) of the chain(s) excluding the first maritime vessel;

a sum of estimated throughputs of the first maritime vessel which are based on the historical spectrum efficiency(ies) of the chain(s) excluding the first maritime vessel; and a sum of ratios between the estimated throughputs of the first maritime vessel and the historical traffic throughput(s) of the chain(s) excluding the first maritime vessel.

17. A method performed by a management server in a network, the network comprising one or more first maritime vessels in a first mode where a licensed spectrum and an unlicensed spectrum can be used freely without restriction of national jurisdiction, and one or more second maritime vessels in a second mode where the use of the licensed spectrum and the unlicensed spectrum is subject to national jurisdiction, the method comprising:

in response to a trigger event indicating that a second maritime vessel can be switched from the second mode to the first mode, updating an operation mode of the second maritime vessel from the second mode to the first mode; and notifying the update of the operation mode of the second maritime vessel to at least one target maritime vessel in the network.

18. A method performed by a management server in a network, the network comprising two or more first maritime vessels in a first mode where a licensed spectrum and an unlicensed spectrum can be used freely without restriction of national jurisdiction, and one or more second maritime vessels in a second mode where the use of the licensed spectrum and the unlicensed spectrum is subject to national jurisdiction, the method comprising:

in response to a trigger event indicating that a first maritime vessel can be switched from the first mode to the second mode, updating an operation mode of the first maritime vessel from the first mode to the second mode; and notifying the update of the operation mode of the first maritime vessel to at least one target maritime vessel in the network.

* * * * *